United States Patent
Iarovici et al.

(10) Patent No.: US 9,069,551 B2
(45) Date of Patent: *Jun. 30, 2015

(54) SYSTEMS AND METHODS OF EXITING HIBERNATION IN RESPONSE TO A TRIGGERING EVENT

(75) Inventors: Yaniv Iarovici, Kfar Saba (IL); Daniel Zvi Yerushalmi, Ra'Anana (IL); Itzhak Pomerantz, Kefar Sava (IL); Rahav Yairi, Oranit (IL)

(73) Assignee: SANDISK TECHNOLOGIES INC., Plano, TX (US)

( * ) Notice: Subject to any disclaimer, the term of this patent is extended or adjusted under 35 U.S.C. 154(b) by 200 days.

This patent is subject to a terminal disclaimer.

(21) Appl. No.: 13/335,332

(22) Filed: Dec. 22, 2011

(65) Prior Publication Data

US 2013/0166932 A1 Jun. 27, 2013

(51) Int. Cl.
*G06F 1/32* (2006.01)

(52) U.S. Cl.
CPC ............ *G06F 1/3275* (2013.01); *G06F 1/3206* (2013.01); *G06F 1/3231* (2013.01); *Y02B 60/1228* (2013.01); *Y02B 60/1289* (2013.01)

(58) Field of Classification Search
CPC ...... G06F 1/3203; G06F 1/3231; G06F 1/329
USPC .................. 713/300, 310, 320, 323
See application file for complete search history.

(56) References Cited

U.S. PATENT DOCUMENTS

| | | | |
|---|---|---|---|
| 5,805,910 A | 9/1998 | Lee et al. | |
| 5,995,139 A | 11/1999 | Lee | |
| 6,356,965 B1 * | 3/2002 | Broyles et al. | 710/104 |
| 6,462,992 B2 | 10/2002 | Harari et al. | |
| 6,654,895 B1 * | 11/2003 | Henkhaus et al. | 713/320 |
| 6,901,298 B1 * | 5/2005 | Govindaraj et al. | 700/21 |
| 6,961,859 B2 * | 11/2005 | Derocher et al. | 713/320 |
| 7,072,989 B1 | 7/2006 | Kolokowsky et al. | |
| 7,093,923 B2 * | 8/2006 | Silverbrook et al. | 347/40 |
| 7,499,733 B2 | 3/2009 | Burgan et al. | |
| 7,505,795 B1 | 3/2009 | Lim et al. | |
| 7,757,060 B2 | 7/2010 | Montero et al. | |
| 8,117,428 B2 * | 2/2012 | Breton et al. | 713/1 |
| 8,230,246 B1 * | 7/2012 | Sharkey | 713/320 |
| 2002/0087816 A1 | 7/2002 | Atkinson et al. | |

(Continued)

FOREIGN PATENT DOCUMENTS

| | | |
|---|---|---|
| EP | 2416229 A2 | 2/2012 |
| GB | 2477417 A | 8/2011 |
| WO | 2011154776 A1 | 12/2011 |

OTHER PUBLICATIONS

Non-Final Office Action mailed Sep. 3, 2013 in U.S. Appl. No. 13/335,180, 21 pages.
Non-Final Office Action mailed Aug. 14, 2013 in U.S. Appl. No. 13/335,246, 23 pages.
The International Search Report and Written Opinion mailed Feb. 1, 2013 in International Application No. PCT/US2012/065862,10 pages.

(Continued)

*Primary Examiner* — Vincent Tran
(74) *Attorney, Agent, or Firm* — Toler Law Group, PC

(57) ABSTRACT

A method may be performed by an electronic device coupled to a volatile system memory. The method includes entering a hibernation mode of the electronic device, where in the hibernation mode, the volatile system memory is powered off. The method further includes detecting a triggering event and, in response to detecting the triggering event, exiting the hibernation mode. While exiting the hibernation mode, the volatile system memory is powered and a pre-hibernation state of the volatile system memory is restored.

21 Claims, 17 Drawing Sheets

(56) References Cited

U.S. PATENT DOCUMENTS

| | | | |
|---|---|---|---|
| 2003/0051182 A1* | 3/2003 | Tsirkel et al. | 713/320 |
| 2004/0032605 A1* | 2/2004 | Regimbal | 358/1.13 |
| 2004/0225904 A1* | 11/2004 | Perez et al. | 713/320 |
| 2005/0114641 A1 | 5/2005 | O'Connor et al. | |
| 2006/0080501 A1 | 4/2006 | Auerbach et al. | |
| 2006/0190750 A1* | 8/2006 | Maggi et al. | 713/320 |
| 2006/0259803 A1* | 11/2006 | Edwards et al. | 713/320 |
| 2007/0085677 A1* | 4/2007 | Neff et al. | 340/539.22 |
| 2007/0288687 A1 | 12/2007 | Panabaker | |
| 2008/0008313 A1 | 1/2008 | Fyke | |
| 2008/0028243 A1* | 1/2008 | Morisawa | 713/323 |
| 2008/0172518 A1 | 7/2008 | Shmulevich et al. | |
| 2008/0228997 A1 | 9/2008 | Farhan et al. | |
| 2008/0234935 A1 | 9/2008 | Wolf et al. | |
| 2009/0138738 A1* | 5/2009 | Chen et al. | 713/323 |
| 2009/0292934 A1 | 11/2009 | Esliger | |
| 2009/0307511 A1* | 12/2009 | Fiennes et al. | 713/323 |
| 2010/0003944 A1 | 1/2010 | Orr et al. | |
| 2010/0048256 A1* | 2/2010 | Huppi et al. | 455/574 |
| 2010/0057983 A1 | 3/2010 | Borras et al. | |
| 2010/0058007 A1 | 3/2010 | Yamauchi | |
| 2010/0058018 A1 | 3/2010 | Kund et al. | |
| 2010/0058088 A1* | 3/2010 | Busch et al. | 713/323 |
| 2010/0106886 A1 | 4/2010 | Marcu et al. | |
| 2010/0115309 A1* | 5/2010 | Carvalho et al. | 713/320 |
| 2010/0138838 A1* | 6/2010 | Lin et al. | 718/102 |
| 2010/0151919 A1 | 6/2010 | Caskey | |
| 2010/0162020 A1 | 6/2010 | Maule et al. | |
| 2010/0235504 A1* | 9/2010 | Sengupta et al. | 709/224 |
| 2010/0235667 A1 | 9/2010 | Mucignat et al. | |
| 2010/0250985 A1* | 9/2010 | Gupta | 713/323 |
| 2010/0262799 A1 | 10/2010 | Lasser et al. | |
| 2010/0313050 A1* | 12/2010 | Harrat et al. | 713/323 |
| 2011/0185208 A1* | 7/2011 | Iwamoto et al. | 713/323 |
| 2011/0231595 A1 | 9/2011 | Wakrat et al. | |
| 2011/0302538 A1* | 12/2011 | Vennelakanti et al. | 715/863 |
| 2012/0036381 A1 | 2/2012 | Masuda | |
| 2012/0169608 A1* | 7/2012 | Forutanpour et al. | 345/173 |
| 2012/0221875 A1* | 8/2012 | Bak et al. | 713/323 |
| 2012/0254631 A1* | 10/2012 | Skillman et al. | 713/300 |
| 2013/0166864 A1* | 6/2013 | Yerushalmi et al. | 711/162 |
| 2013/0166866 A1* | 6/2013 | Yerushalmi et al. | 711/162 |

OTHER PUBLICATIONS

U.S. Appl. No. 13/335,180, filed Dec. 22, 2011, 34 pages.
U.S. Appl. No. 13/335,246, filed Dec. 22, 2011, 42 pages.
U.S. Appl. No. 13/335,288, filed Dec. 22, 2011, 54 pages.
The International Search Report and Written Opinion mailed Feb. 1, 2013 in International Application No. PCT/US2012/065875, 9 pages.
The International Search Report and Written Opinion mailed Apr. 29, 2013 in International Application No. PCT/US2012/065868, 13 pages.
The International Search Report and Written Opinion mailed May 7, 2013 in International Application No. PCT/US2012/065881,12 pages.
Notice of Allowance and Fee(s) Due mailed Sep. 6, 2013 in U.S. Appl. No. 13/335,288, 11 pages.
Notice of Allowance and Fee(s) Due mailed Dec. 16, 2013 in U.S. Appl. No. 13/335,288, 10 pages.
Final Office Action mailed Jan. 27, 2014 in U.S. Appl. No. 13/335,246, 29 pages.
Final Office Action mailed Jan. 28, 2014 in U.S. Appl. No. 13/335,180, 26 pages.
Notice of Allowance and Fee(s) Due mailed Mar. 4, 2014 in U.S. Appl. No. 13/335,288, 8 pages.
Non-Final Office Action mailed Sep. 16, 2014 in U.S. Appl. No. 13/335,180, 23 pages.
Non-Final Office Action mailed Aug. 14, 2014 in U.S. Appl. No. 13/335,246, 28 pages.
International Preliminary Report on Patentability for International Application No. PCT/US2012/065875, issued Jun. 24, 2014, 5 pages.
International Preliminary Report on Patentability for International Application No. PCT/US2012/065862 issued Jun. 24, 2014, 6 pages.
International Preliminary Report on Patentability for International Application No. PCT/US2012/065868, issued Jun. 24, 2014, 8 pages.
International Preliminary Report on Patentability for International Application No. PCT/US2012/065881, issued Jun. 24, 2014, 8 pages.
Notice of Allowance and Fee(s) Due mailed Jun. 13, 2014 in U.S. Appl. No. 13/335,288, 8 pages.

\* cited by examiner

SYSTEMS AND METHODS OF EXITING HIBERNATION IN RESPONSE TO A TRIGGERING EVENT

FIELD OF THE DISCLOSURE

The present disclosure is generally related to exiting a hibernation mode of a device.

BACKGROUND

Use of mobile devices, such as portable wireless telephones, personal digital assistants (PDAs), and paging devices that are small, lightweight, and easily carried by users is widespread. However, power consumption of such mobile devices can quickly deplete a battery within the device. Many devices include one or more components that can enter a low-power mode, such as a sleep mode or a hibernation mode, when not in use. However, system memory includes information that is typically needed by the mobile device and that is lost when the memory loses power. Preparation for and waking up from the low-power mode in such devices may be time consuming, which may negatively impact a user experience provided by the mobile device.

SUMMARY

Power savings may be achieved by a multi-chip package that is configured to enter a low-power state (e.g., by shutting off power to at least a portion of a volatile memory in the multi-chip package). For example, power savings may be achieved by a multi-chip package that is configured to enter a hibernation mode by copying data from a volatile system memory to non-volatile memory. An electronic device coupled to the multi-chip package may detect a triggering event and exit the hibernation mode in response to detecting the triggering event. While exiting the hibernation mode, the volatile system memory is powered and a pre-hibernation state of the volatile system memory is restored.

DETAILED DESCRIPTION

A data storage device performs a data save operation that copies data from a volatile memory in the data storage device to a non-volatile memory in the data storage device in response to determining, based on an indication from a host device, that the data storage device is to enter a low-power state (e.g., hibernation). Copying the data from the volatile memory to the non-volatile memory prevents loss of the data upon interruption of power to the volatile memory.

Systems and methods of performing a data save operation are disclosed. The data save operation copies data from a volatile memory of the data storage device to a non-volatile memory of the data storage device in response to an indication from a host device that the data storage device is to enter a low-power state. Copying the data to the non-volatile memory prevents loss of the data upon interruption of power to the volatile memory.

A method may be performed by an electronic device coupled to a multi-chip package that includes a controller, a non-volatile memory, and a volatile memory. The method includes entering a hibernation mode of the electronic device, where in the hibernation mode, the volatile system memory is powered off. The method further includes detecting a triggering event and, in response to detecting the triggering event, exiting the hibernation mode. While exiting the hibernation mode, the volatile system memory is powered and a pre-hibernation state of the volatile system memory is restored.

Figure 1:
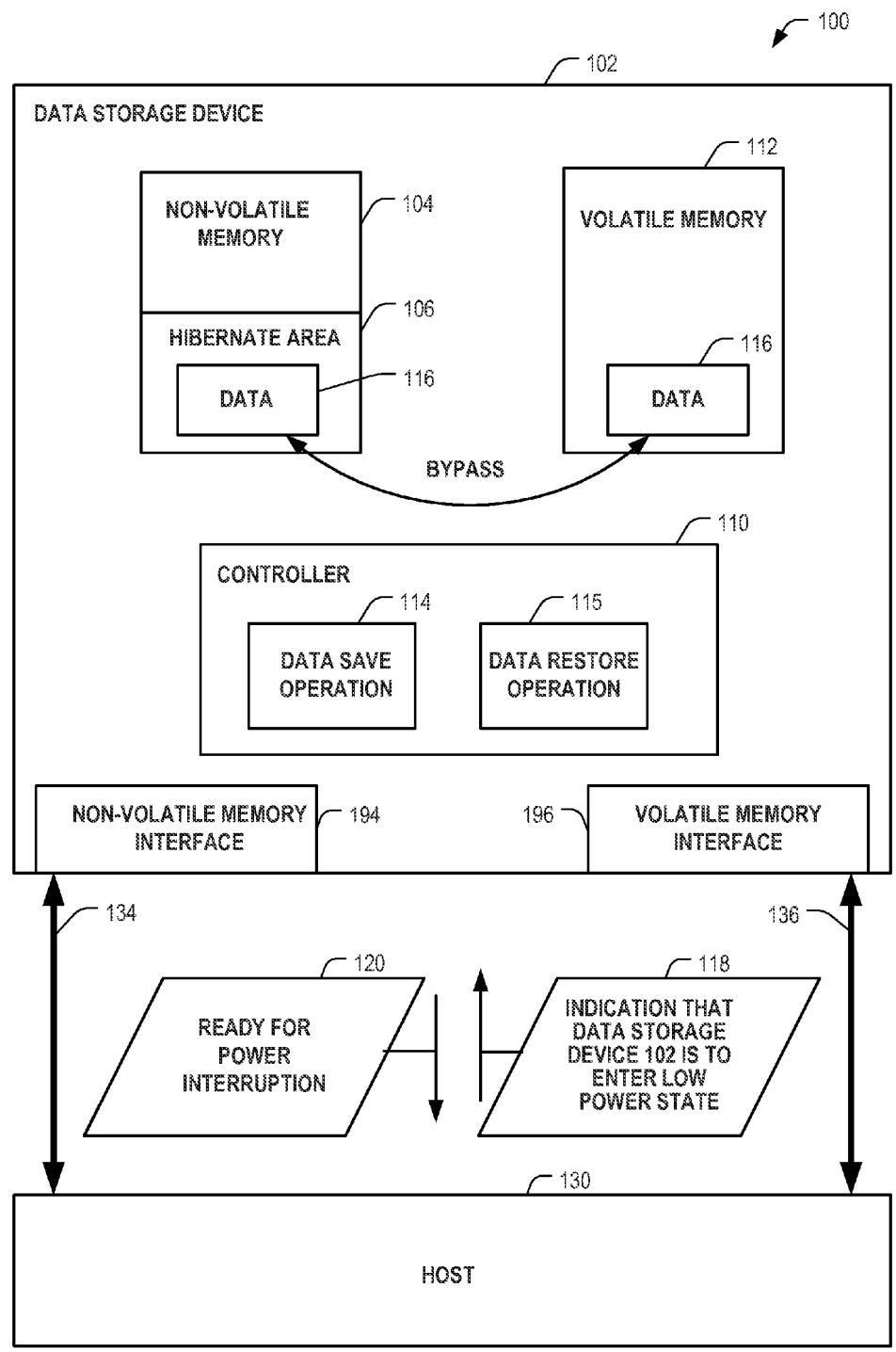
FIG. 1 is a block diagram of a first illustrative embodiment of a system to perform a data save operation that copies data from a volatile memory to a non-volatile memory.

Referring to FIG. 1, a particular illustrative embodiment of a system to perform a data save operation that copies data from a volatile memory to a non-volatile memory is depicted and generally designated 100. The system 100 includes a data storage device 102 coupled to a host device 130. The data storage device 102 includes a volatile memory 112 and a non-volatile memory 104 coupled to a controller 110. The volatile memory 112 may be a random access memory (RAM).

The host device 130 may be configured to provide data to be stored at the volatile memory 112 or at the non-volatile memory 104 or to request data to be read from the volatile memory 112 or from the non-volatile memory 104. For example, the host device 130 may include a mobile telephone, a music or video player, a gaming console, an electronic book reader, a personal digital assistant (PDA), a computer, such as a laptop computer, a notebook computer, or a tablet, any other electronic device, or any combination thereof.

The data storage device 102 is a multi chip package (MCP) device. The MCP device includes a non-volatile memory interface 194 to enable access to the non-volatile memory 104 by the host device 130 and a volatile memory interface 196 to enable access to the volatile memory 112 by the host device 130. The data storage device 102 is coupled to the host device 130 via a non-volatile memory bus 134 and a random access memory bus 136. The non-volatile memory bus 134 is coupled to the non-volatile memory interface 194 and the random access memory bus 136 is coupled to the volatile memory interface 196. The data storage device 102 may provide non-volatile storage and volatile storage to the host device 130 via the non-volatile memory bus 134 and the random access memory bus 136, respectively.

The non-volatile memory 104 may be a non-volatile memory of a flash device, such as a NAND flash device, a NOR flash device, or any other type of flash device. The non-volatile memory 104 includes a hibernate area 106. The hibernate area 106 may be a physical partition in the non-volatile memory 104, a dedicated range of storage blocks in the non-volatile memory 104, or a separate storage device, as illustrative examples. The hibernate area 106 may be configured to store data 116 that has been copied from the volatile memory 112 to the hibernate area 106 of the non-volatile memory 104.

The controller 110 controls operations of the non-volatile memory 104 and the volatile memory 112. For example, the controller 110 may include a flash controller or may be coupled to a separate flash controller. The controller 110 may be configured, upon receiving an instruction from the host device 130, to instruct the volatile memory 112 or the non-volatile memory 104 to store data or to instruct the volatile memory 112 or the non-volatile memory 104 to read data.

The controller 110 may be configured to enter a hibernation or other low-power state, upon receiving an instruction from the host device 130. For example, the controller 110 may be configured to determine, based on an indication 118 received from the host device 130, that the data storage device 102 is to enter a low-power state. The controller 110 may receive a power event signal from the host device 130 indicating a sleep state or a power off state, as described with respect to FIG. 4. As another example, the controller 110 may receive a hibernation instruction from the host device 130 indicating a hibernation state, as described with respect to FIG. 5, or may detect a period of inactivity, as described with respect to FIG. 6. Alternatively, the controller 110 may be configured to enter a hibernation or other low-power state independent of any instructions from the host device 130.

In response to determining that the data storage device 102 is to enter the low-power state, the controller 110 may perform a data save operation 114 that bypasses the non-volatile memory interface 194 and the volatile memory interface 196 and that copies the data 116 from the volatile memory 112 to the hibernate area 106 of the non-volatile memory 104. Copying the data 116 from the volatile memory 112 to the hibernate area 106 of the non-volatile memory 104 prevents loss of the data 116 upon interruption of power to the volatile memory 112. To illustrate, the data save operation 114 may include copying the data 116 from the volatile memory 112 to the controller 110, and writing the data 116 from the controller 110 to the hibernate area 106 of the non-volatile memory 104 via the bus 150. Upon completion of the data save operation 114, an indication 120 may be sent to the host device 130 that the data storage device 102 is prepared for interruption of power supplied by the host device 130.

During operation, while the data storage device 102 is operatively coupled to the host device 130, the host device 130 may send read requests and/or write requests to access the non-volatile memory 104 and to access the volatile memory 112. The controller 110 is configured to process the read requests and the write requests.

The host device 130 may send the indication 118 that the data storage device 102 is to enter the low-power state. In response to determining, based on the indication 118, that the data storage device 102 is to enter the low-power state, the controller 110 may perform the data save operation 114 that bypasses the non-volatile memory interface 194 and the volatile memory interface 196 and copies the data 116 from the volatile memory 112 to the non-volatile memory 104. For example, the data 116 may be copied from the volatile memory 112 to the hibernate area 106 of the non-volatile memory 104 via a dedicated bus, such as described with respect to FIG. 3, or via multiple internal buses, such as described with respect to FIG. 2. Upon completion of the data save operation 114, the controller 110 may send the indication 120 to the host device 130 indicating that the data storage device 102 is prepared for interruption of power supplied by the host device 130. Alternatively, or in addition, the controller 110 may be configured, upon completion of the data save operation 114, to power off the volatile memory 112 while maintaining power to the controller 110, such as described with respect to FIG. 7. Upon completion of the data save operation 114, the controller 110 may cause the data storage device 102 to enter the low-power state.

After the data storage device 102 enters the low-power state, the controller 110 may be configured to cause the data storage device 102 to exit the low-power state. For example, the controller 110 may be configured to perform a data restore operation 115. The data restore operation 115 may include copying stored data from the non-volatile memory 104 to the volatile memory 112 to restore a memory image of the volatile memory 112. The stored data may be copied from the non-volatile memory 104 to the controller 110 and then from the controller 110 to the volatile memory 112, as described in further detail with respect to FIG. 2. Alternatively, the stored data may be copied from the non-volatile memory 104 to the volatile memory 112 via a hibernation bus, as described in further detail with respect to FIG. 3.

In implementations where the volatile memory 112 is powered off while the controller 110 remains operational, powering off the volatile memory 112 reduces overall power consumption of the data storage device 102. Performing the data save operation 114 enables the data storage device 102, upon power up, to more quickly revert to a state that the data storage device 102 was in prior to entering the low-power state because the data 116 copied from the volatile memory 112 to the non-volatile memory 104 may be readily available to the host device 130 upon power up and without requiring participation of the host device in the data storage and the data retrieval related to the data save operation 114.

Figure 2:
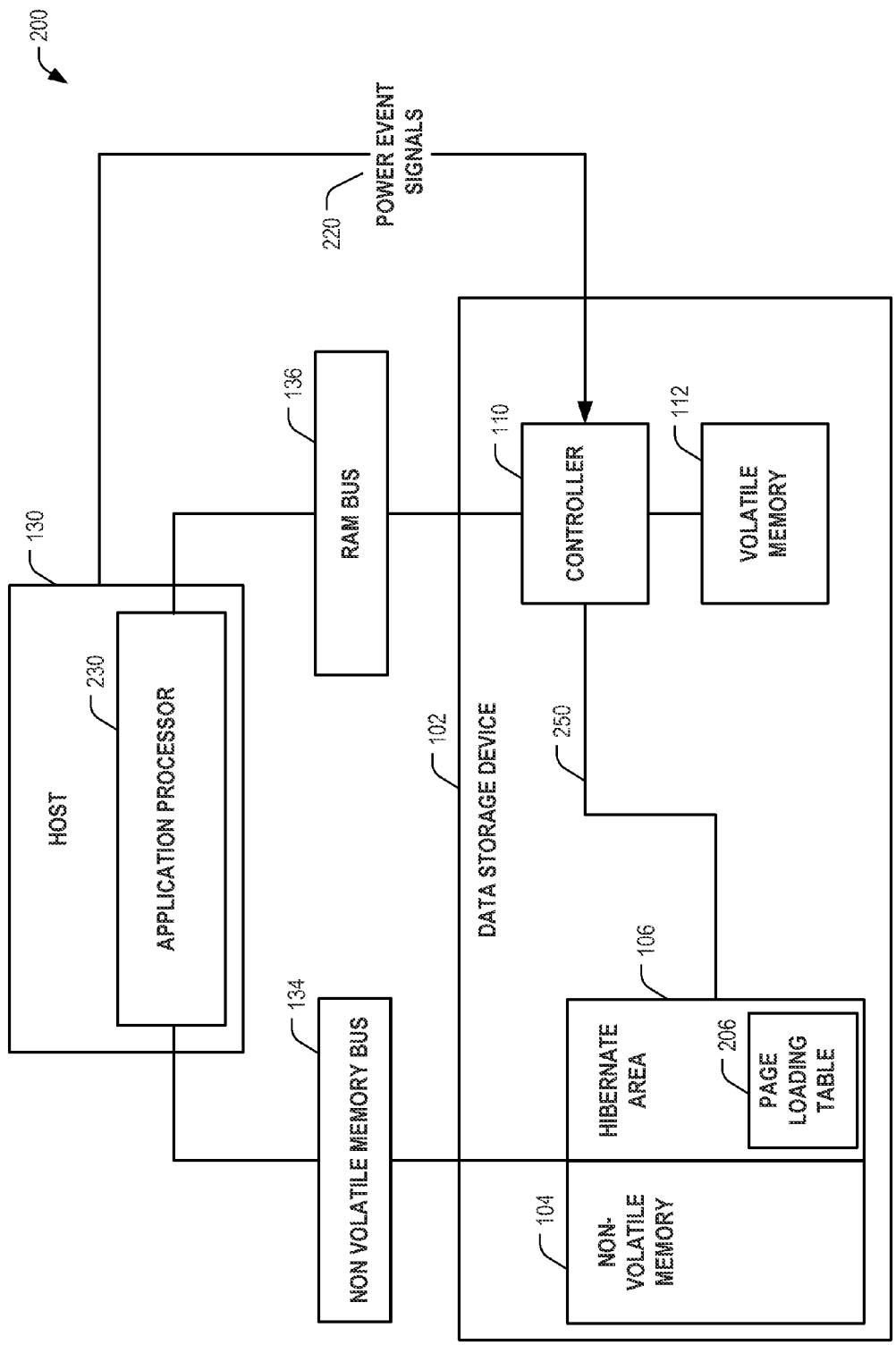
FIG. 2 is diagram of a second illustrative embodiment of the system of FIG. 1.

Referring to FIG. 2, a second illustrative embodiment of the system of FIG. 1 is depicted and generally designated 200. The system 200 includes the data storage device 102 coupled to the host device 130. The data storage device 102 includes the non-volatile memory 104, the hibernate area 106, the controller 110, and the volatile memory 112.

The host device 130 includes an application processor 230 coupled to the non-volatile memory (NVM) bus 134. The application processor 230 is also coupled to the random access memory (RAM) bus 136. The host device 130 may be coupled to the data storage device 102 via the NVM bus 134 and the RAM bus 136. The application processor 230 may communicate with the non-volatile memory 104 via the NVM bus 134. The application processor 230 may communicate with the volatile memory 112 via the RAM bus 136 and the controller 110.

The controller 110 may provide an interface between the RAM bus 136 and the volatile memory 112. The controller 110 may translate addressing from the application processor 230 to RAM addressing. The controller 110 may also be configured to receive power event signals 220 from the host device 130. The power event signals 220 may include one or more hardware signals indicating a sleep state of the data storage device 102 or a power off state of the data storage device 102. The controller 110 may be configured to detect receipt of the power event signals 220 from the host device 130 and, based on the power event signals 220, determine that the data storage device 102 is to enter a low-power (e.g., sleep or power off) state. In response to determining that the data storage device 102 is to enter the low-power state, the controller 110 may perform the data save operation 114 of FIG. 1. The controller 110 may be configured to initiate data transfer between the volatile memory 112 and the non-volatile memory 104 by passing data from the volatile memory 112 through the controller 110 to the hibernate area 106 of the non-volatile memory 104. To illustrate, the controller 110 may be configured to initiate a read operation to read data from the volatile memory 112, to encode the read data for storage at the hibernate area 106 (e.g., error correction coding (ECC) encoding), and to write the encoded data to the hibernate area 106 of the non-volatile memory 104 via the bus 150.

During operation, while the data storage device 102 is operatively coupled to the host device 130, the host device 130 may send the power event signals 220 indicating that the data storage device 102 is to enter the low-power state (e.g., indicating a sleep state of the data storage device 102 or a power off state of the data storage device 102). In response to determining, based on the power event signals 220, that the data storage device 102 is to enter the low-power state, the controller 110 may perform the data save operation 114 that copies the data 116 from the volatile memory 112 to the non-volatile memory 104.

The controller 110 may be configured to access a page loading table 206 that is stored in the hibernate area 106 and to use the page loading table 206 to determine an order of data retrieval upon exiting the low-power state. For example, the page loading table 206 may indicate a loading order of memory pages to be copied from a volatile memory image stored in the hibernate area 106 to the volatile memory 112. The controller 110 may incorporate or use a memory management unit to determine the loading order and may maintain the indication of the loading order in the page loading table 206.

In implementations where the volatile memory 112 is powered off while the controller 110 remains operational, powering off the volatile memory 112 reduces overall power consumption of the data storage device 102. Performing the data save operation 114 enables the data storage device 102, upon power up, to more quickly revert to a state that the data storage device 102 was in prior to entering the low-power state. The data 116 copied from the volatile memory 112 to the non-volatile memory 104 may be readily available to the application processor 230 upon power up and without requiring participation of the application processor 230 in the data storage and the data retrieval.

Figure 3:
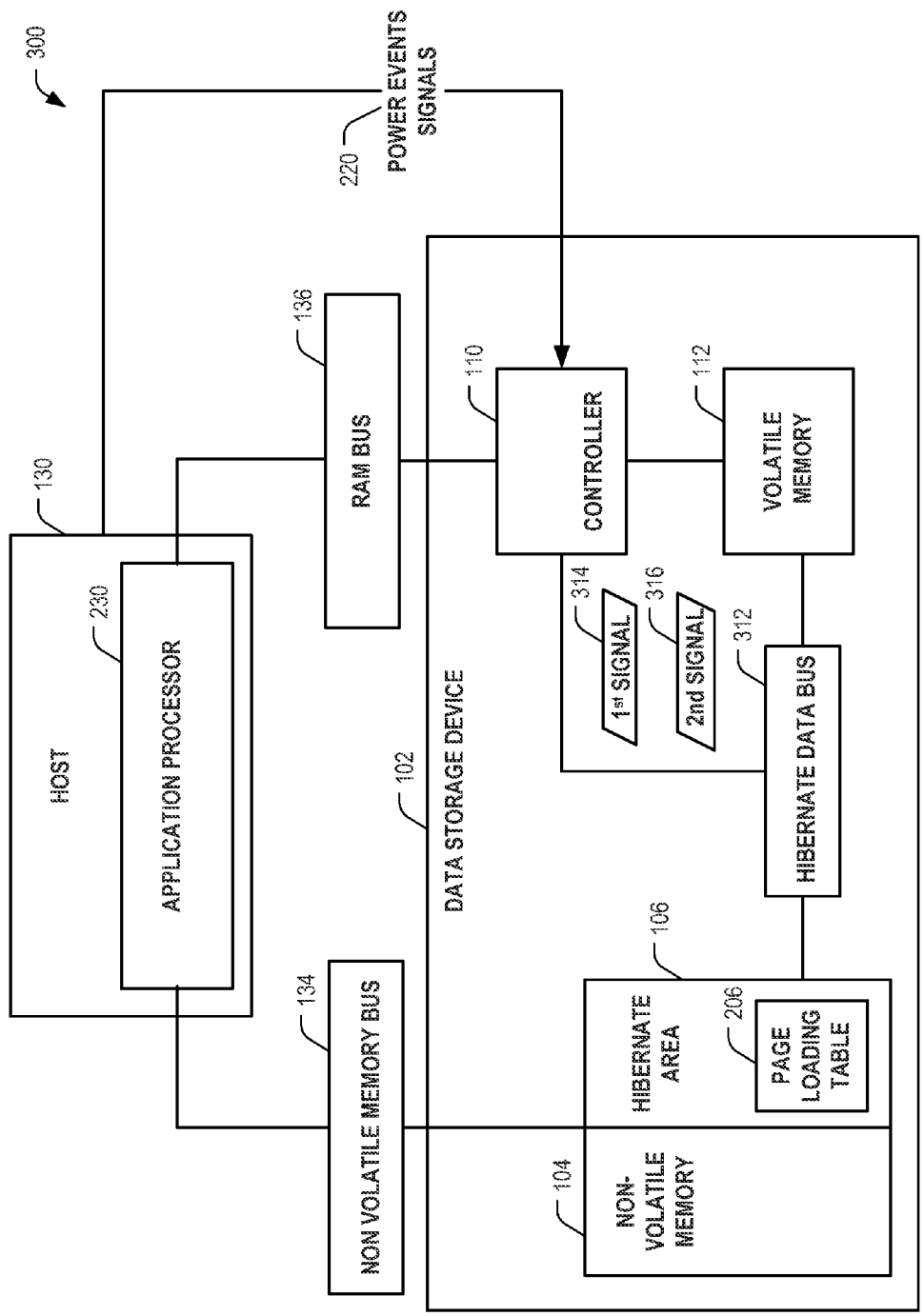
FIG. 3 is a diagram of a third illustrative embodiment of the system of FIG. 1.

Referring to FIG. 3, a third illustrative embodiment of the system of FIG. 1 is depicted and generally designated 300. The system 300 includes the data storage device 102 coupled to the host device 130. The host device 130 includes the application processor 230 coupled to the non-volatile memory bus 134 and coupled to the RAM bus 136. The data storage device 102 includes the controller 110, the non-volatile memory 104, the hibernate area 106, the page loading table 206, and the volatile memory 112. The data storage device 102 includes a hibernate data bus 312 to enable data transfer between the non-volatile memory 104 and the volatile memory 112 to bypass the controller 110.

The controller 110 is coupled to the hibernate data bus 312, and the hibernate data bus 312 connects the non-volatile memory 104 and the volatile memory 112. The controller 110 may be configured to detect receipt of the power event signals 220 from the host device 130 and to determine, based on the power event signals 220, that the data storage device 102 is to enter the low-power state. The controller 110 may be configured to perform the data save operation by generating a first bus control signal 314 (e.g., a signal, a command, etc.) to cause the hibernate data bus 312 to access data from the volatile memory 112 and to generate a second bus control signal 316 (e.g., a signal, a command, etc.) to cause the hibernate data bus 312 to send the data to the hibernate area 106 of the non-volatile memory 104. The page loading table 206 may be accessed by the controller 110 and used to determine a loading order of memory pages from a volatile memory image stored in the hibernate area 106 to the volatile memory 112 upon wakeup from the low-power state.

Using the hibernate data bus 312 may be faster for the data save operation or the data restore operation as compared to FIG. 2. For example, the controller 110 may be coupled to the non-volatile memory 104 via a bus and to the volatile memory 112 via another bus, such as illustrated in FIG. 2. Data transfer between the non-volatile memory 104 and the controller 110 and between the controller 110 and the volatile memory 112, as described with respect to FIG. 2, may introduce additional latency as compared to data transfer between the non-volatile memory 104 and the volatile memory 112 via the hibernate data bus 312. As a result, entering the low-power state and/or exiting the low-power state may be performed more quickly as compared to the system of FIG. 2.

Figure 4:
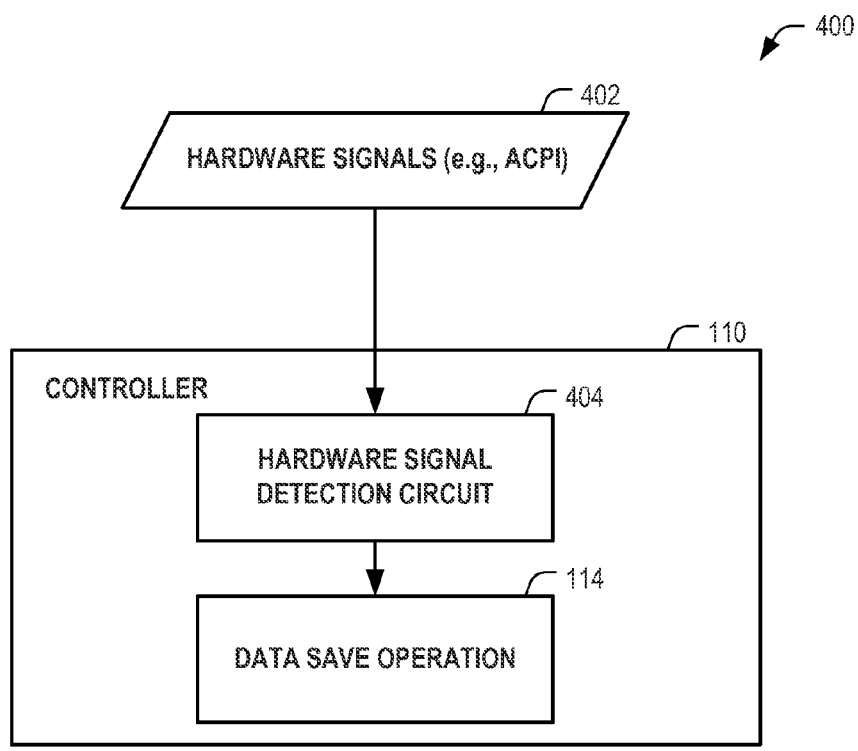
FIG. 4 is a block diagram that illustrates a particular embodiment of receipt of hardware signals that indicate that a data storage device is to enter a low-power state.
Figure 5:
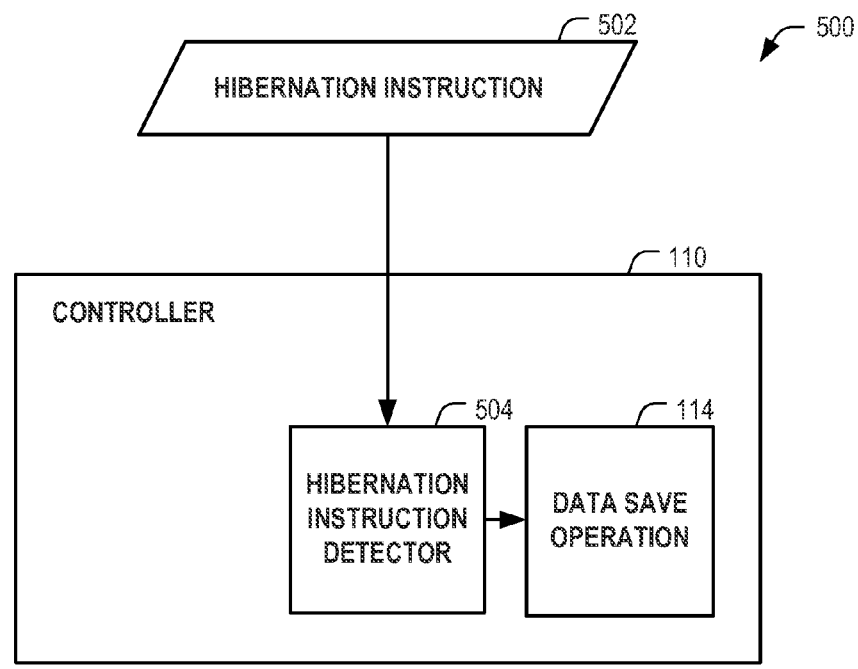
FIG. 5 is a block diagram that illustrates a particular embodiment of receipt of a hibernation instruction that indicates that a data storage device is to enter a low-power state.
Figure 6:
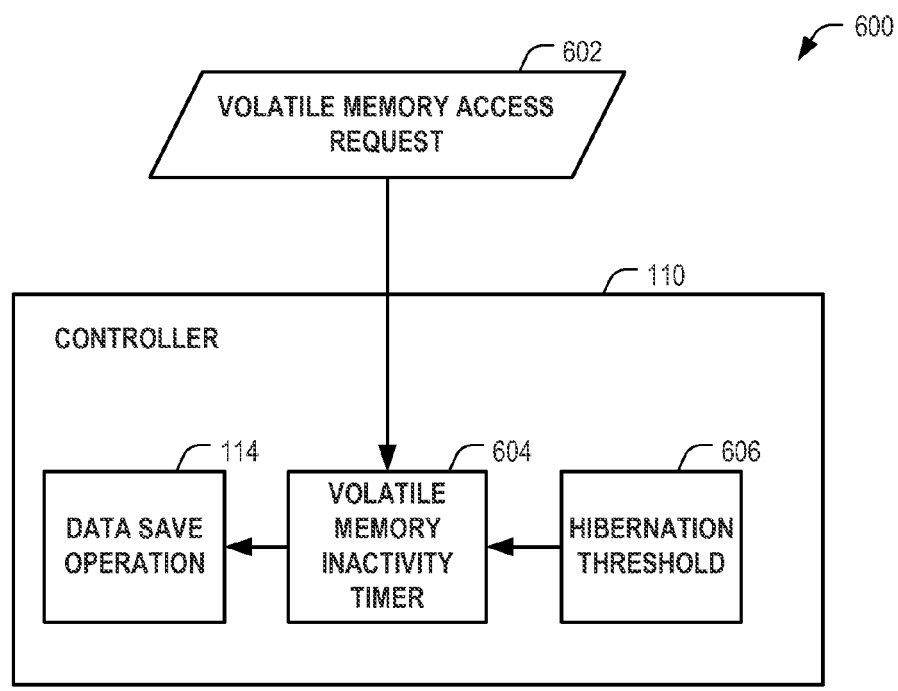
FIG. 6 is a block diagram that illustrates a particular embodiment of receipt of a timer value exceeding a hibernation threshold to indicate that a data storage device is to enter a low-power state, where the timer value indicates an elapsed time since receipt of a request from the host device to access the volatile memory.

FIGS. 4-6 are examples of different indications that may be sent from a host device to a data storage device to indicate that the data storage device is to enter a low-power state, such as the indication 118 sent by the host device 130 of FIG. 1 to the controller 106 to indicate that the data storage device 102 of FIG. 1 is to enter the low-power state. For example, referring to FIG. 4, a diagram 400 illustrates receipt of hardware signals 402. The diagram 400 includes the controller 110 configured to receive the hardware signals 402 from the host device 130 at a hardware signal detection circuit 404. The hardware signals 402 may indicate a sleep state or a power off state. For example, the hardware signals 402 may be compatible with the advanced configuration and power interface (ACPI) specification for device configuration and power management, such as the Advanced Configuration and Power Interface Specification, Revision 5.0, released Nov. 23, 2011.

The controller 110 may be configured to, in response to determining that the data storage device 102 is to enter the low-power state in response to receiving the hardware signals 402, perform the data save operation 114 that copies data from the volatile memory 112 to the non-volatile memory 104. After the data save operation 114 has completed, the data storage device 102 may enter a hibernation state. For example, the data storage device 102 may enter the hibernation state automatically after completing the data save operation 114.

As another example, the hardware signals 402 may cause the data storage device 102 to enter the hibernation state. For example, the hardware signals 402 may indicate a sleep state, where the sleep state includes the hibernation state. The hardware signal detection circuit 404 may detect the hardware signals 402, may cause the data save operation 114 to be performed, and may cause the controller 110 to instruct the data storage device 102 to enter the hibernation state after the data save operation 114 has completed.

Referring to FIG. 5, a diagram 500 illustrates receipt of a hibernation instruction 502 from the application processor 230 of the host device 130 at a hibernation instruction detector 504 of the controller 110 of FIG. 1, FIG. 2, or FIG. 3. The hibernation instruction 502 may indicate the hibernation state.

The controller 110 may be configured to, in response to determining that the data storage device 102 is to enter the low-power state in response to receiving the hibernation instruction 502, perform the data save operation 114 that copies data from the volatile memory 112 to the non-volatile memory 104. After the data save operation 114 has completed, the data storage device 102 may enter the hibernation state. For example, the hibernation instruction detector 504 may detect the hibernation instruction 502, may cause the data save operation 114 to be performed, and may cause the controller 110 to instruct the data storage device 102 to enter the hibernation state after the data save operation 114 has completed.

Referring to FIG. 6, a diagram 600 illustrates receipt of a request to access the volatile memory 112, such as a volatile memory access request 602. The controller 110 may be configured to determine that the data storage device 102 is to enter a low-power state by determining that an elapsed time since receipt of a most recent volatile memory access request 602 from the host device 130 to access the volatile memory 112 has exceeded a threshold.

For example, a volatile memory inactivity timer 604 may be a running timer that is reset each time a volatile memory access request 602 is received. A value of the volatile memory inactivity timer 604 may be compared to a threshold, such as a hibernation threshold 606. Based on the comparison between the inactivity timer 604 and the hibernation threshold 606, the data save operation 114 may be executed. For example, if the value of the volatile memory inactivity timer 604 exceeds the hibernation threshold 606 (e.g., the elapsed time since receipt of the volatile memory access request 602 to access the volatile memory 112 has exceeded an inactivity limit), the data save operation 114 may be executed.

After the data save operation 114 has completed, the data storage device 102 may enter the hibernation state. For example, the data storage device 102 may enter the hibernation state automatically after the data save operation 114 has completed and without instruction or intervention from the host device 130. As a result of autonomously entering the hibernation state, a power saving benefit may be provided to host devices that may not support hibernation. In addition, by performing the data save operation 114 without intervention from an application processor of the host device, a processing load of the application processor of the host device is reduced as compared to an implementation where the host device directs the data transfer from volatile memory to non-volatile memory.

Figure 7:
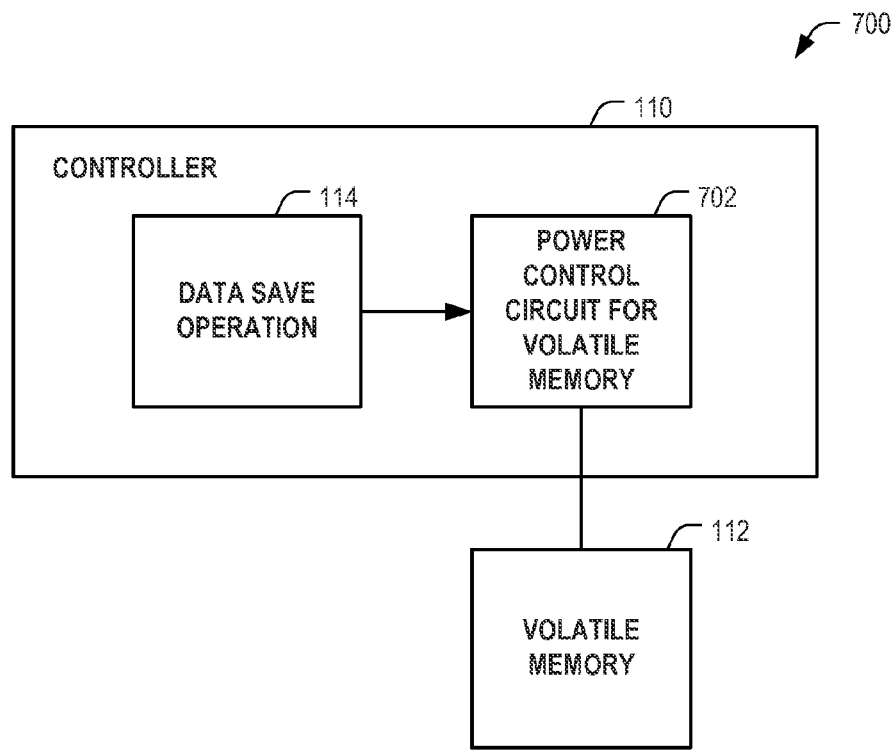
FIG. 7 is a block diagram that illustrates a particular embodiment of powering off the volatile memory of a data storage device.

Referring to FIG. 7, a diagram 700 illustrates an embodiment of the controller 110 of FIGS. 1-3 configured to power off the volatile memory 112. The controller 110 may be configured to execute the data save operation 114. The controller 110 may be configured, upon completion of the data save operation 114, to power off the volatile memory 112 while maintaining power to the controller 110. For example, a power control circuit 702 for the volatile memory may be configured to detect that the data save operation 114 has completed. To illustrate, the power control circuit 702 for the volatile memory may include an input coupled to receive a result value that is generated by the data save operation 114. Upon detecting completion of the data save operation 114, the power control circuit 702 for the volatile memory may cause the controller 110 to interrupt a power supply to the volatile memory 112. As a result, the controller 110 may power off the volatile memory 112 while maintaining power to the controller 110.

Figure 8:
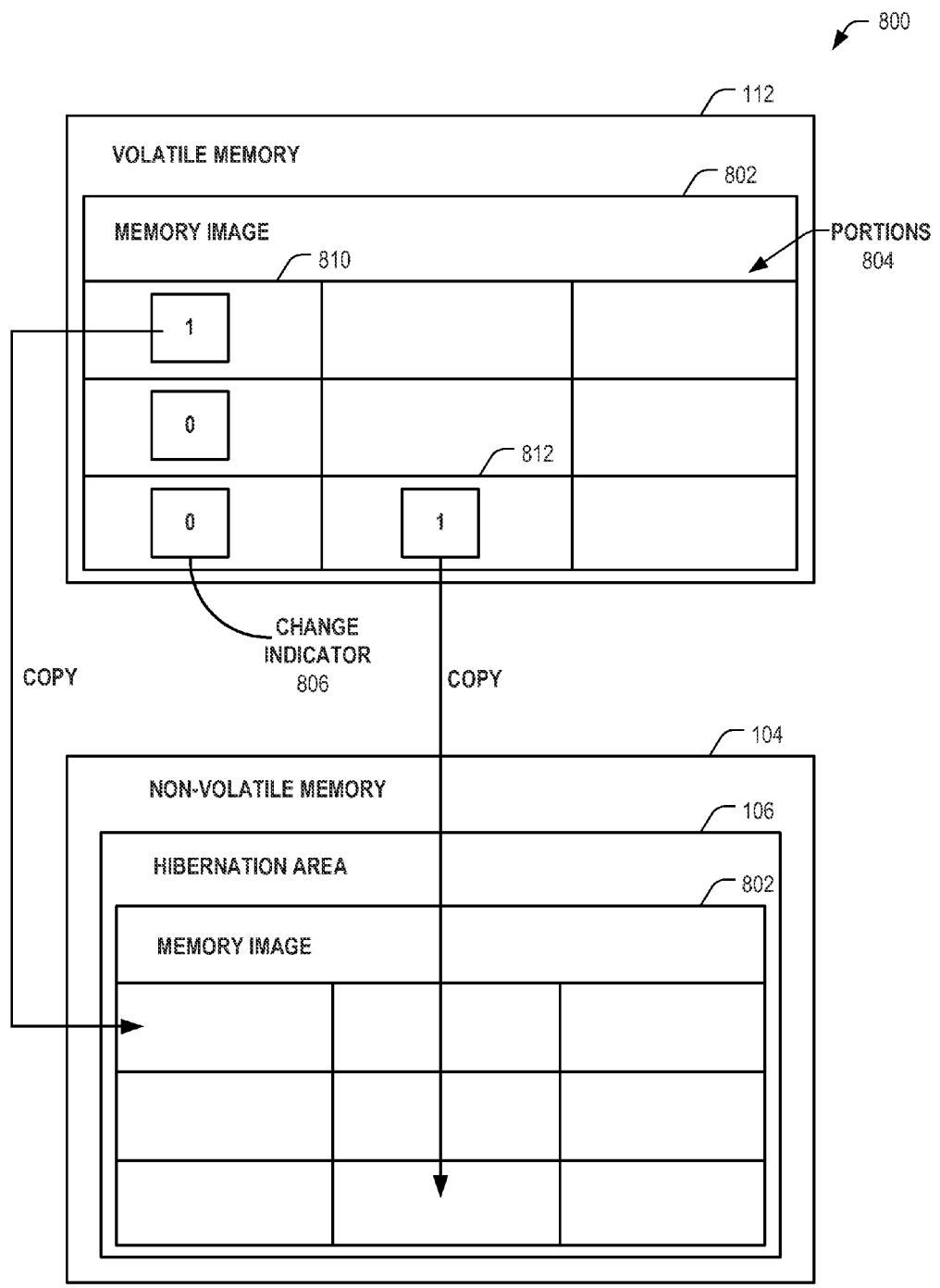
FIG. 8 is a block diagram that illustrates a particular embodiment of a data save operation that copies data from the volatile memory to a non-volatile memory of a data storage device.

Referring to FIG. 8, a diagram 800 illustrates a data save operation that copies data from the volatile memory 112 to the non-volatile memory 104. The volatile memory 112 includes a memory image 802 including multiple memory portions 804, such as representative memory portions 810 and 812. The memory image 802 may include a copy of data in at least a portion of the volatile memory 112. Each particular memory portion of the multiple memory portions 804 may have a change indicator 806 that indicates whether the particular memory portion has been modified since a most recent data restore operation. For example, the data save operation 114 may cause the memory image 802 of the volatile memory 112 to be stored in the non-volatile memory 104. However, if a portion of the memory image 802 has not changed since a last save to the non-volatile memory 104, the portion need not be re-saved to the non-volatile memory 104. The data save operation 114 may selectively copy one or more of the memory portions 804 of the volatile memory 112 to the non-volatile memory 104 based on whether one or more of the change indicators 806 indicates that one or more of the memory portions 804 have been modified since a most recent data restore operation.

For example, a change indicator value of "1" in the memory portion 810 may indicate that the memory portion 810 has been modified since a most recent data restore operation. Based on the indication that the memory portion 810 has been modified since a most recent data restore operation, the memory portion 810 may be selectively copied from the volatile memory 112 to the non-volatile memory 104 during the data save operation 114. Similarly, a change indicator value of "1" in the memory portion 812 may indicate that the memory portion 812 has been modified since a most recent data restore operation, and based on the indication, the memory portion 812 may be selectively copied from the volatile memory 112 to the non-volatile memory 104 during the data save operation 114. A change indicator value of "0" in one or more of the memory portions 804 may indicate that the one or more memory portions 804 have not been modified since a most recent data restore operation. In that case, the memory portions 804 having a change indicator value of "0" may not be copied from the volatile memory 112 to the non-volatile memory 104 during the data save operation 114.

By selectively copying data that has been modified since a most recent data restore operation from the volatile memory 112 to the non-volatile memory 104 and not copying data that has not been modified since the most recent data restore operation from the volatile memory 112 to the non-volatile memory 104, latency may be improved as compared to copying all the data in the memory image 802 regardless of whether the data has been modified.

Figure 9:
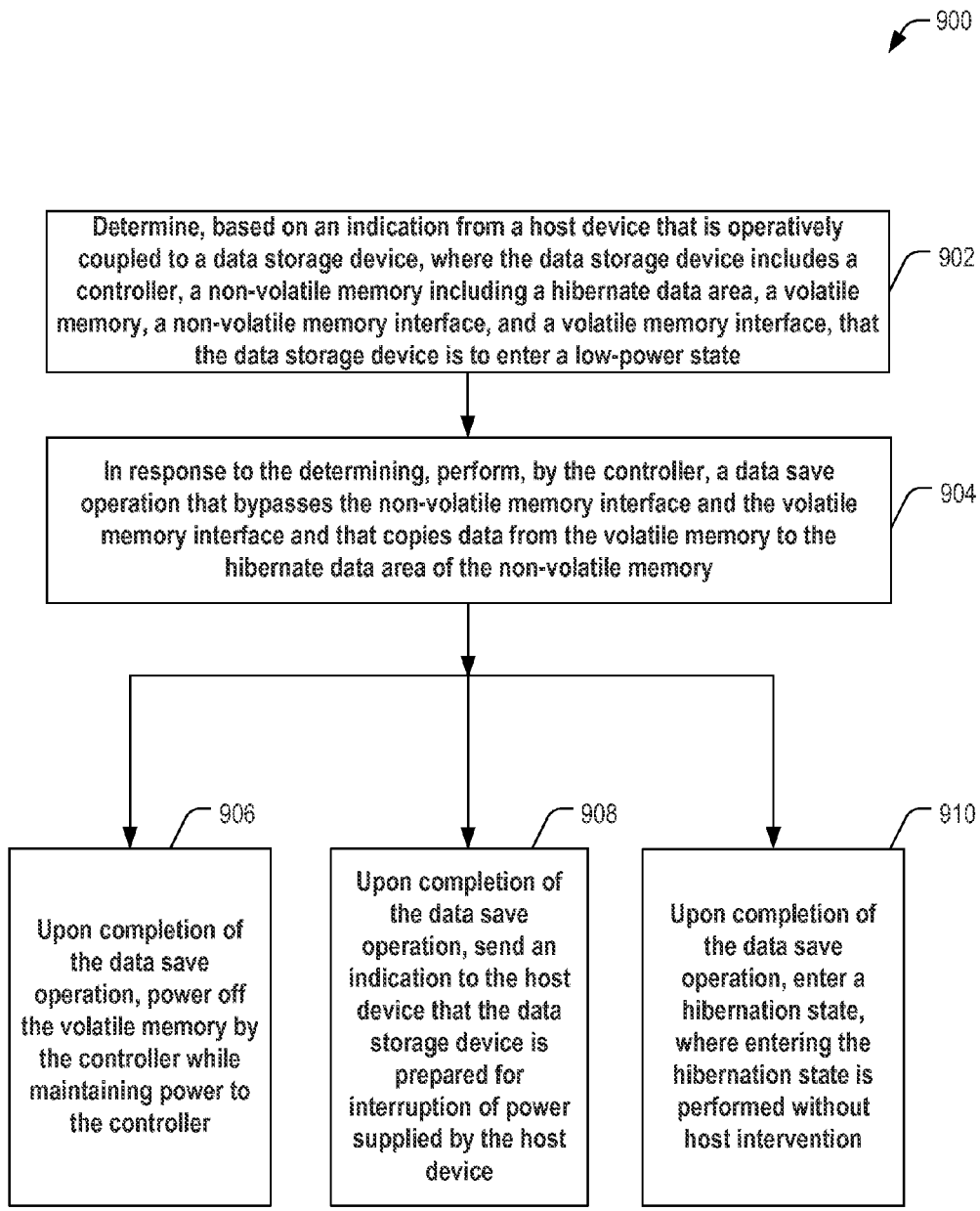
FIG. 9 is a flow diagram illustrating a particular embodiment of a method of performing a data save operation that copies data from a volatile memory to a non-volatile memory of a data storage device.

FIG. 9 depicts a flowchart that illustrates an embodiment of a method 900 of performing a data save operation that copies data from a volatile memory to a non-volatile memory. The method 900 may be performed by a data storage device having a controller, a non-volatile memory including a hibernate area, a volatile memory, a non-volatile memory interface, and a volatile memory interface. For example, the method 900 may be performed by the data storage device 102 of FIG. 1, FIG. 2, and FIG. 3.

A determination is made, based on an indication from a host device, that the data storage device is to enter a low-power state, at 902. To illustrate, the controller 110 may receive one or more of the power event signals 220 from the host device 130. For example, the controller 110 may receive one or more hardware signals, such as the hardware signals 402 of FIG. 4, indicating the sleep state or the power off state. Alternatively, the controller 110 may detect receipt of a hibernation instruction, such as the hibernation instruction 502 from the host device 130 of FIG. 5, indicating the hibernation state. Alternatively, the controller 110 may detect that a timer value exceeds a hibernation threshold, where the timer value indicates an elapsed time since receipt of a most recently received request from the host device to access the volatile memory. For example, a value of the volatile memory inactivity timer 604 of FIG. 6 may be determined to exceed the hibernation threshold 606.

In response to determining that the data storage device is to enter the low-power state, a data save operation that copies data from the volatile memory to the hibernate area of the non-volatile memory is performed by the controller, at 904. Copying the data to the non-volatile memory prevents loss of the data upon interruption of power to the volatile memory. For example, the data save operation may include bypassing the non-volatile memory interface 194 and the volatile memory interface 196 and copying the data 116 from the volatile memory 112 to the controller 110, and writing the data 116 from the controller 110 to the hibernate area 106 of the non-volatile memory 104 via the bus 250. Alternatively, the data save operation 114 may include bypassing the non-volatile memory interface 194 and the volatile memory interface 196 and generating the first bus control signal 314 to cause the hibernate data bus 312 to access the data 116 from the volatile memory 112 and generating the second bus control signal 316 to cause the hibernate data bus 312 to send the data 116 to the hibernate area 106 of the non-volatile memory 104.

Upon completion of the data save operation, the volatile memory may be powered off by the controller while maintaining power to the controller, at 906. For example, the power control circuit 702 may detect that the data save operation 114 has completed. Upon detecting completion of the data save operation 114, the power control circuit 702 may cause the controller 110 to power off the volatile memory 112 while maintaining power to the controller 110.

Alternatively, upon completion of the data save operation, an indication may be sent to the host device that the data storage device is prepared for interruption of power supplied by the host device, at 908. For example, the indication 120 may be sent to the host device 130 that the data storage device 102 is prepared for interruption of power supplied by the host device 130.

Alternatively, upon completion of the data save operation, a hibernation state may be entered, where entering the hibernation state is performed without host intervention or host action, at 910. For example, the data storage device 102 may enter the hibernation state automatically after the data save operation 114.

In implementations where the volatile memory 112 is powered off but the controller 110 remains operational, powering off the volatile memory 112 reduces overall power consumption of the data storage device 102. Performing the data save operation 114 enables the data storage device 102, upon power up, to more quickly revert to a state that the data storage device 102 was in prior to entering the low-power state. The data 116 copied from the volatile memory 112 to the non-volatile memory 104 may be readily available to the host device 130 upon power up and without requiring participation of the host device in the data storage and the data retrieval related to the data save operation 114. In implementations where the host device 130 interrupts power to the data storage device 102, performing the data save operation 114 enables the data storage device to protect data stored at the volatile memory 112 prior to powering off and without requiring participation of the host device in the data storage and the data retrieval related to the data save operation 114.

Figure 10:
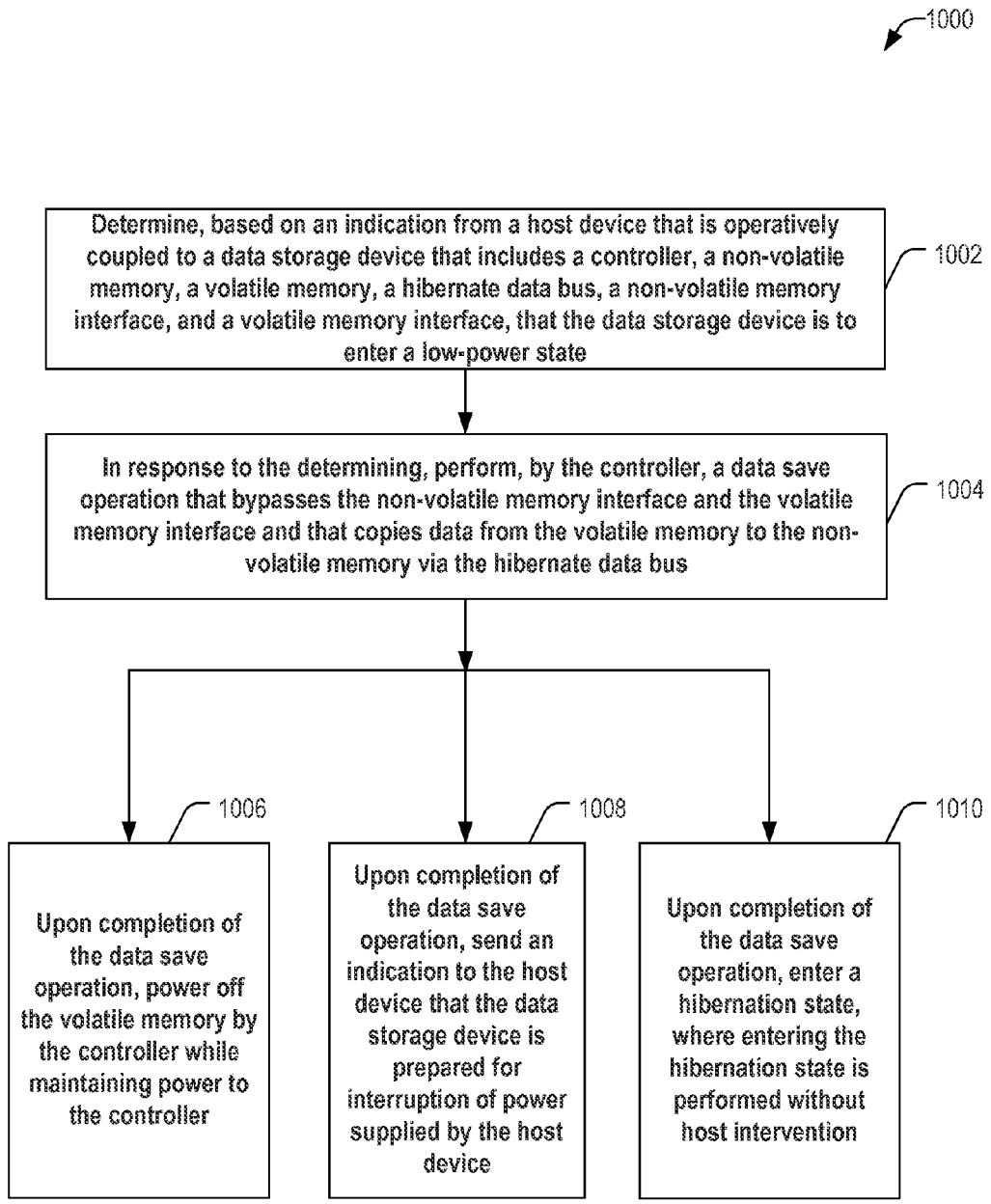
FIG. 10 is a flow diagram illustrating another particular embodiment of a method of performing a data save operation that copies data from a volatile memory to a non-volatile memory of a data storage device.

FIG. 10 depicts a flowchart that illustrates another embodiment of a method 1000 of performing a data save operation that copies data from a volatile memory to a non-volatile memory. The method 1000 may be performed by a data storage device having a controller, a non-volatile memory, a volatile memory, a hibernate data bus that connects the non-volatile memory and the volatile memory, a non-volatile memory interface, and a volatile memory interface. For example, the method 1000 may be performed by the data storage device 102 of FIG. 1 and FIG. 3.

A determination is made, based on an indication from a host device, that the data storage device is to enter a low-power state, at 1002. To illustrate, the controller 110 may receive one or more of the power event signals 220 from the host device 130. For example, the controller 110 may receive one or more hardware signals, such as the hardware signals 402 of FIG. 4, indicating the sleep state or the power off state. Alternatively, the controller 110 may detect receipt of a hibernation instruction, such as the hibernation instruction 502 from the host device 130 of FIG. 5, indicating the hibernation state. Alternatively, the controller 110 may detect that a timer value exceeds a hibernation threshold, where the timer value indicates an elapsed time since receipt of a most recently received request from the host device to access the volatile memory. For example, a value of the volatile memory inactivity timer 604 of FIG. 6 may be determined to exceed the hibernation threshold 606.

In response to determining that the data storage device is to enter the low-power state, a data save operation that copies data from the volatile memory to the non-volatile memory is performed by the controller, at 1004. Copying the data to the non-volatile memory prevents loss of the data upon interruption of power to the volatile memory. For example, the data save operation may include bypassing the non-volatile memory interface 194 and the volatile memory interface 196 and copying the data 116 from the volatile memory 112 to the hibernate area 106 of the non-volatile memory 104 via the hibernate data bus 312 by generating the first bus control signal 314 to cause the hibernate data bus 312 to access the data 116 from the volatile memory 112 and generating the second bus control signal 316 to cause the hibernate data bus 312 to send the data 116 to the hibernate area 106 of the non-volatile memory 104.

Upon completion of the data save operation, the volatile memory may be powered off by the controller while maintaining power to the controller, at 1006. For example, the power control circuit 702 may detect that the data save operation 114 has completed. Upon detecting completion of the data save operation 114, the power control circuit 702 may cause the controller 110 to power off the volatile memory 112 while maintaining power to the controller 110.

Alternatively, upon completion of the data save operation, an indication may be sent to the host device that the data storage device is prepared for interruption of power supplied by the host device, at 1008. For example, the indication 120 may be sent to the host device 130 that the data storage device 102 is prepared for interruption of power supplied by the host device 130.

Alternatively, upon completion of the data save operation, a hibernation state may be entered, where entering the hibernation state is performed without host intervention or host action, at 1010. For example, the data storage device 102 may enter the hibernation state automatically after the data save operation 114.

In implementations where the volatile memory 112 is powered off but the controller 110 remains operational, powering off the volatile memory 112 reduces overall power consumption of the data storage device 102. Performing the data save operation 114 enables the data storage device 102, upon power up, to more quickly revert to a state that the data storage device 102 was in prior to entering the low-power state. The data 116 copied from the volatile memory 112 to the non-volatile memory 104 may be readily available to the host device 130 upon power up and without requiring participation of the host device in the data storage and the data retrieval related to the data save operation 114. In implementations where the host device 130 interrupts power to the data storage device 102, performing the data save operation 114 enables the data storage device 102 to protect data stored at the volatile memory 112 prior to powering off and without requiring participation of the host device 130 in the data storage and the data retrieval related to the data save operation 114.

Figure 11:
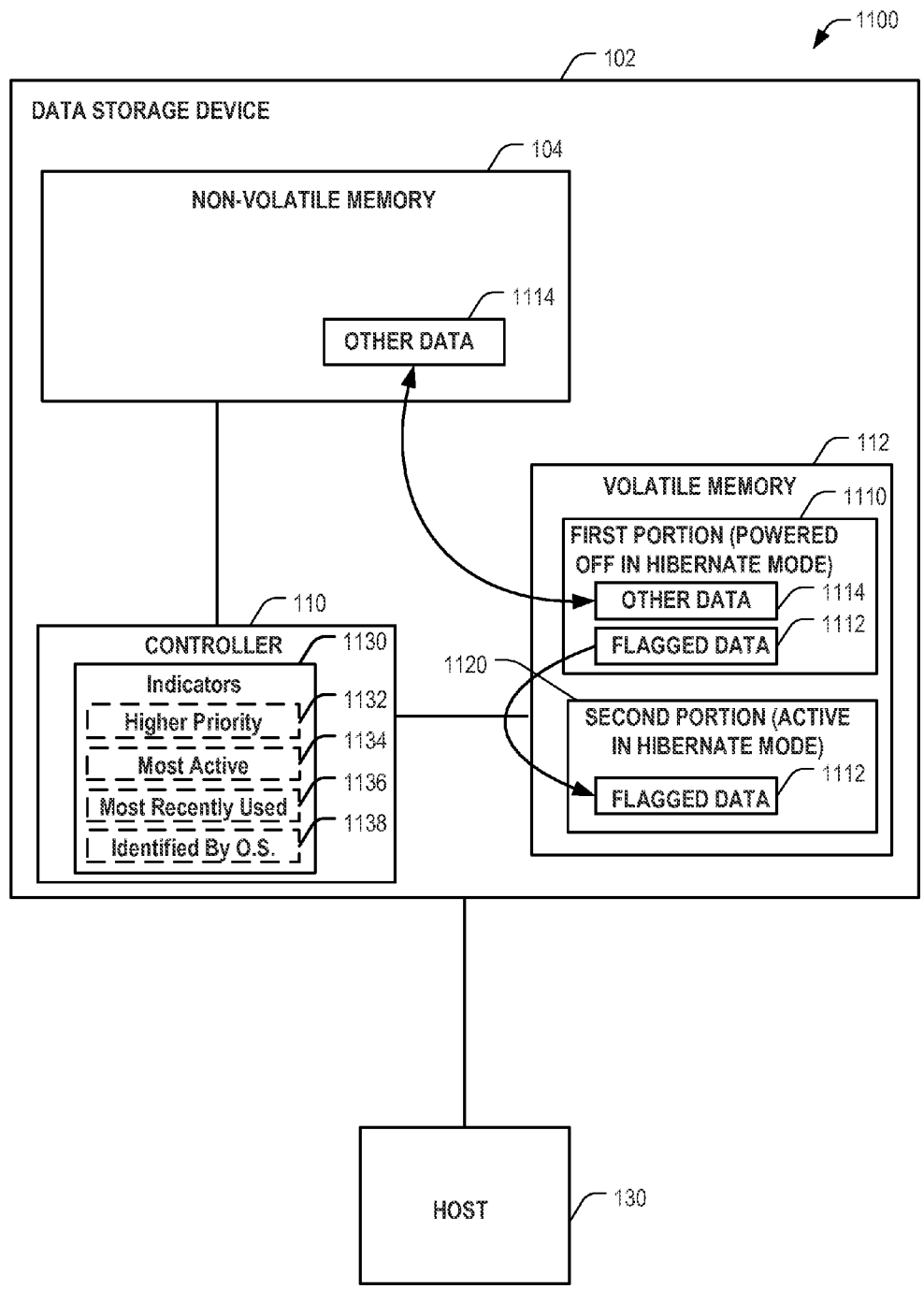
FIG. 11 is a block diagram that illustrates a particular embodiment of a system to perform a data save operation that copies data from a volatile memory to a non-volatile memory of a data storage device.

Referring to FIG. 11, a particular illustrative embodiment of a system to perform a data save operation that copies data from a volatile memory to a non-volatile memory is depicted and generally designated 1100. The system 1100 includes the data storage device 102 coupled to the host device 130. The data storage device 102 includes the non-volatile memory 104, the controller 110, and the volatile memory 112.

The volatile memory 112 includes a first portion 1110 and a second portion 1120. The first portion 1110 of the volatile memory 112 may be powered off in a hibernate mode and the second portion 1120 of the volatile memory 112 may maintain power during the hibernate mode. The first portion 1110 contains data including flagged data 1112 and other data 1114. The flagged data 1112 corresponds to data that is to remain available to the host device 130 at the volatile memory 112 during the hibernation mode. For example, the flagged data 1112 may be data that has been indicated as having a priority that is higher than that of the other data 1114. The other data 1114 corresponds to data that does not remain available to the host device 130 at either the volatile memory 112 or the non-volatile memory 104 during the hibernation mode.

The controller 110 may be configured to receive one or more indicators 1130 that are indicative of a data priority and to flag particular data in the first portion 1110 of the volatile memory 112 according to the one or more indicators 1130. For example, the one or more indicators 1130 may include a higher priority indicator 1132 that indicates particular data having a higher priority than other data. The one or more indicators 1130 may include a most active indicator 1134 that indicates particular data that is most active within the data storage device 102 and having a higher priority than other data. The one or more indicators 1130 may include a most recently used indicator 1136 that indicates particular data that has been most recently used within the data storage device 102 and having a higher priority than other data. The one or more indicators 1130 may include an identified by operating system indicator 1138 that indicates particular data identified by an operating system of the data storage device 102 or of the host device 130 as having a higher priority than other data.

The controller 110 is configured to cause the volatile memory 112 to enter the hibernation mode. For example, the controller 110 is configured to copy, to the second portion 1120, data 1112 that is in the first portion 1110 and that is flagged to remain available to the host device 130 at the volatile memory 112 during the hibernation mode. Copying the flagged data 1112 from the first portion 1110 to the second portion 1120 may prevent loss of the flagged data 1112 due to the first portion 1110 being powered off. The data 1112 may be flagged according to the one or more indicators 1130. The second portion 1120 maintains power during the hibernation mode and the flagged data 1112 remains accessible at the volatile memory 112 to the host device 130 while the volatile memory 112 is in the hibernation mode.

The controller 110 may be configured to copy the other data 1114 in the first portion 1110 to the non-volatile memory 104 prior to powering off the first portion 1110. The other data 1114 may be copied to a secure hibernate area of the non-volatile memory 104 and does not remain available to the host device 130 during the hibernate mode.

During operation, while the data storage device 102 is operatively coupled to the host device 130, the host device 130 may send read requests and/or write requests to access the non-volatile memory 104 and to access the volatile memory 112, and the controller 110 processes the received requests. In response to determining that the data storage device 102 is to enter the hibernation mode, the controller 110 may cause the volatile memory 112 to enter the hibernation mode by copying the flagged data 1112 in the first portion 1110 to the second portion 1120 and by copying the other data 1114 in the first portion 1110 to the non-volatile memory 104. After copying the flagged data 1112 from the first portion 1110 to the second portion 1120 and copying the other data 1114 from the first portion 1110 to the non-volatile memory 104, the controller 110 may power off the first portion 1110 while the second portion 1120 maintains power. The flagged data 1112 that was copied from the first portion 1110 to the second portion 1120 remains available to the host device 130 at the volatile memory 112 during the hibernation mode. The other data 1114 that was copied from the first portion 1110 to the secure hibernate area of the non-volatile memory 104 does not remain available to the host device 130 during the hibernate mode.

After the volatile memory 112 enters the hibernation mode, the controller 110 may be configured to cause the volatile memory 112 to exit the hibernation mode. For example, the controller 110 may cause the volatile memory 112 to exit the hibernation mode by copying the other data 1114 from the non-volatile memory 104 to the volatile memory 112 to restore the other data 1114 to the volatile memory 112. The other data 1114 may be copied from the non-volatile memory 104 to the first portion 1110 of the volatile memory 112. Alternatively, the other data 1114 may be copied from the non-volatile memory 104 to the second portion 1120 of the volatile memory 112.

Powering off a portion of the volatile memory 112 while the controller 110 remains operational reduces overall power consumption of the data storage device 102. For example, by powering off a portion of the volatile memory 112 rather than maintaining power to the entire volatile memory 112, power consumption of the data storage device 102 may be reduced, thereby prolonging a battery life of the host device 130.

Copying the other data 1114 that is stored in the volatile memory 112 to the non-volatile memory 104 prior to powering down a portion of the volatile memory 112 allows the other data 1114 to be maintained in the non-volatile memory 104, thereby enabling the data storage device 102 to more quickly revert to a state that the data storage device 102 was in prior to entering the hibernation mode because the other data 1114 copied from the volatile memory 112 to the non-volatile memory 104 may be readily available to the host device 130 upon exiting the hibernation mode and without requiring participation of the host device 130 in the data storage and the data retrieval.

Figure 12:
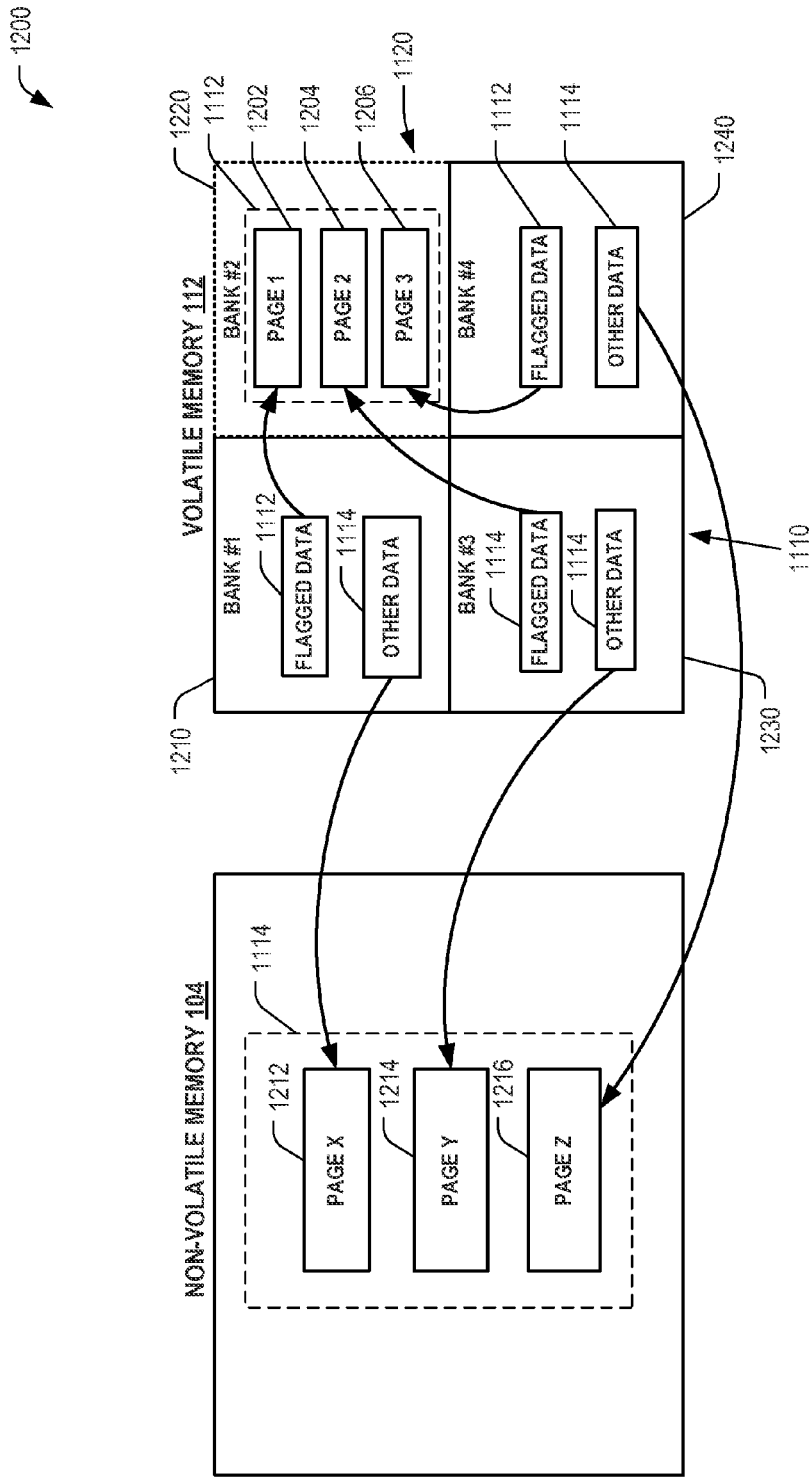
FIG. 12 is a diagram of a second illustrative embodiment of the non-volatile memory and the volatile memory of the system of FIG. 11.

Referring to FIG. 12, a second illustrative embodiment of the system of FIG. 11 is depicted and generally designated 1200. The system 1200 includes the non-volatile memory 104 and the volatile memory 112, and illustrates the first portion 1110 of the volatile memory 112 and the second portion 1120 of the volatile memory 112 of FIG. 11.

The volatile memory 112 includes a plurality of banks to which power can be independently turned on or off, such as a representative first bank 1210, a representative second bank 1220, a representative third bank 1230, and representative fourth bank 1240. Each bank 1210-1240 may be associated with either the first portion 1110 or the second portion 1120. Each bank 1210-1240 may include data, such as the flagged data 1112 and the other data 1114. The flagged data 1112 may include one or more pages, such as representative pages 1202, 1204, and 1206. Similarly, the other data 1114 may include one or more pages, such as representative pages 1212, 1214, and 1216. The flagged data pages 1202-1206 may be indicated by the controller 110 as having a priority that is higher than a priority of the non-flagged data pages 1212-1216. For example, the controller 110 may cause the pages 1202-1206 to be flagged according to the one or more indicators 1130 as being higher priority data, as being most active data, as being most recently used data, or as being provided by an operating system of the data storage device 102 or of the host device 130.

During operation, the controller 110 may cause the volatile memory 112 to enter the hibernation mode. The hibernation mode is entered by copying, to the second portion 1120, the data 1112 that is in the first portion 1110 and that is flagged to remain available at the volatile memory 112 during the hibernation mode, by copying the other data 1114 in the first portion 1110 to the non-volatile memory 104, and by powering off the first portion 1110. The flagged data 1112 may be copied into a particular one of the plurality of banks 1210-1216. To illustrate, the flagged data 1112 in the first bank 1210 may be copied from the first portion 1110 to the second bank 1220 in the second portion 1120. The flagged data 1112 in the third bank 1230 may be copied from the first portion 1110 to the second bank 1220 in the second portion 1120. The flagged data 1112 in the fourth bank 1240 may be copied from the first portion 1110 to the second bank 1220 in the second portion 1120. The flagged data 1112 may include the one or more pages 1202-1206.

The other data 1114 in the first portion 1110 may be copied to the non-volatile memory 104. To illustrate, the other data 1114 in the first bank 1210 (i.e., page "X" 1212) may be copied to the non-volatile memory 104, the other data 1114 in the third bank (i.e., page "Y" 1214) 1230 may be copied to the non-volatile memory 104, and the other data 1114 in the fourth bank (i.e., page "Z" 1216) 1240 may be copied to the non-volatile memory 104.

Figure 13:
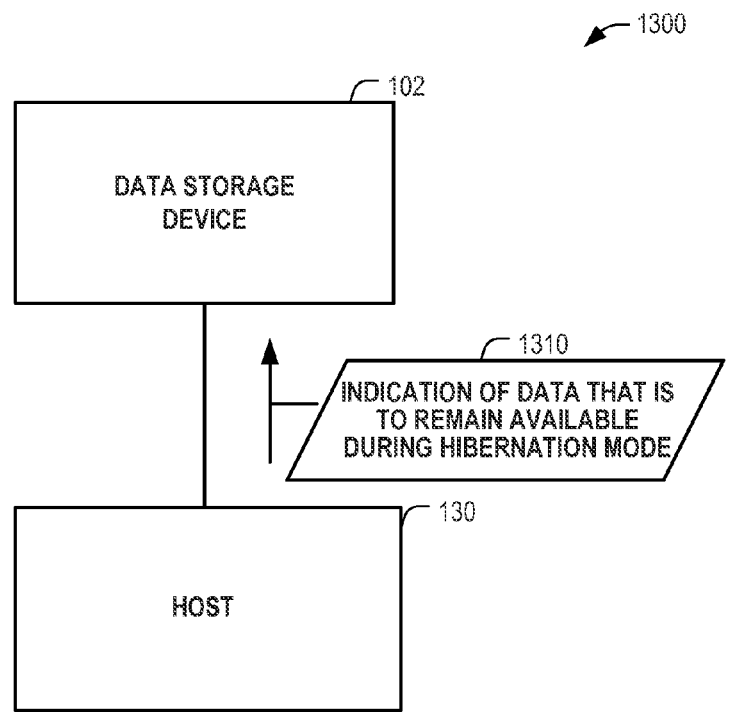
FIG. 13 is a block diagram that illustrates a particular embodiment of receipt of an indication of data that is to remain available at a data storage device during a hibernation mode.

After the flagged data 1112 is copied to the second bank 1220 and the other data 1114 is copied to the non-volatile memory 104, the first portion 1110 may be powered off while maintaining power to the second portion 1120 as described with respect to FIG. 13. In the hibernation mode, the first portion 1110 (i.e., the first bank 1210, the third bank 1230, and the fourth bank 1240) is powered off and the second portion 1120 (i.e., the second bank 1220) remains powered and accessible to the host device 130.

Powering off a portion of the volatile memory 112 while the controller 110 remains operational reduces overall power consumption of the data storage device 102 while enabling the controller 110 and the host device 130 to access the flagged data 1112 at the second portion 1120, thereby enabling the host device 130 to conserve battery power. In addition, a user experience of the host device 130 may be enhanced upon exiting the hibernation mode because the data save operation may enable the data storage device 102 to more quickly revert to a state that the data storage device 102 was in prior to entering the hibernation mode because the other data 1114 copied from the volatile memory 112 to the non-volatile memory 104 may be readily available to the host device 130 upon exiting the hibernation mode and without requiring participation of the host device 130 in the data storage and the data retrieval.

Referring to FIG. 13, a diagram 1300 illustrates receipt, at the data storage device 102, of an indication of data 1310 that is to remain available during a hibernation mode. The indication of data 1310 is received from the host device 130. For example, the controller 110 of FIG. 11 may receive the one or more indicators 1130 from the host device 130 and may cause the data 1112 to be flagged in the first portion 1110 of the volatile memory 112 according to the one or more indicators 1130. The controller 110 may be configured to cause the volatile memory 112 to enter the hibernation mode by copying the flagged data 1112 from the first portion 1110 to the second portion 1120 and powering off the first portion 1110, such as described with respect to FIG. 13.

Figure 14:
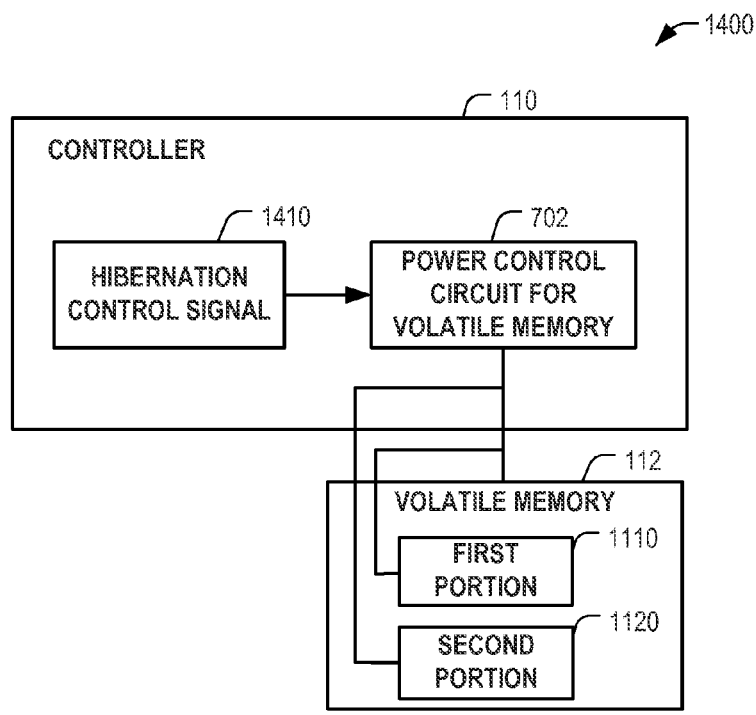
FIG. 14 is a block diagram that illustrates a particular embodiment of the controller of FIG. 11 configured to power off a volatile memory.

Referring to FIG. 14, a diagram 1400 illustrates an embodiment of the controller 110 of FIG. 11 configured to power off the volatile memory 112. The controller 110 may be configured to cause the volatile memory 112 to enter a hibernation mode. For example, the power control circuit 702 of FIG. 7 for the volatile memory 112 may be configured to detect receipt of a hibernation control signal 1410. The hibernation control signal 1410 may indicate that the hibernation mode has been entered, that the flagged data 1112 has been copied from the first portion 1110 to the second portion 1120, and that the other data 1114 has been copied form the first portion 1110 to the non-volatile memory 104. Upon detection of the hibernation control signal 1410, the power control circuit 702 for the volatile memory 112 may cause the controller 110 to interrupt power supplied to the first portion 1110 of the volatile memory 112 while maintaining power to the second portion 1120 of the volatile memory 112. As a result, the controller 110 may power off the first portion 1110 of the volatile memory 1120 while maintaining power to the second portion 1120 of the volatile memory 112 and while maintaining power to the controller 110.

Figure 15:
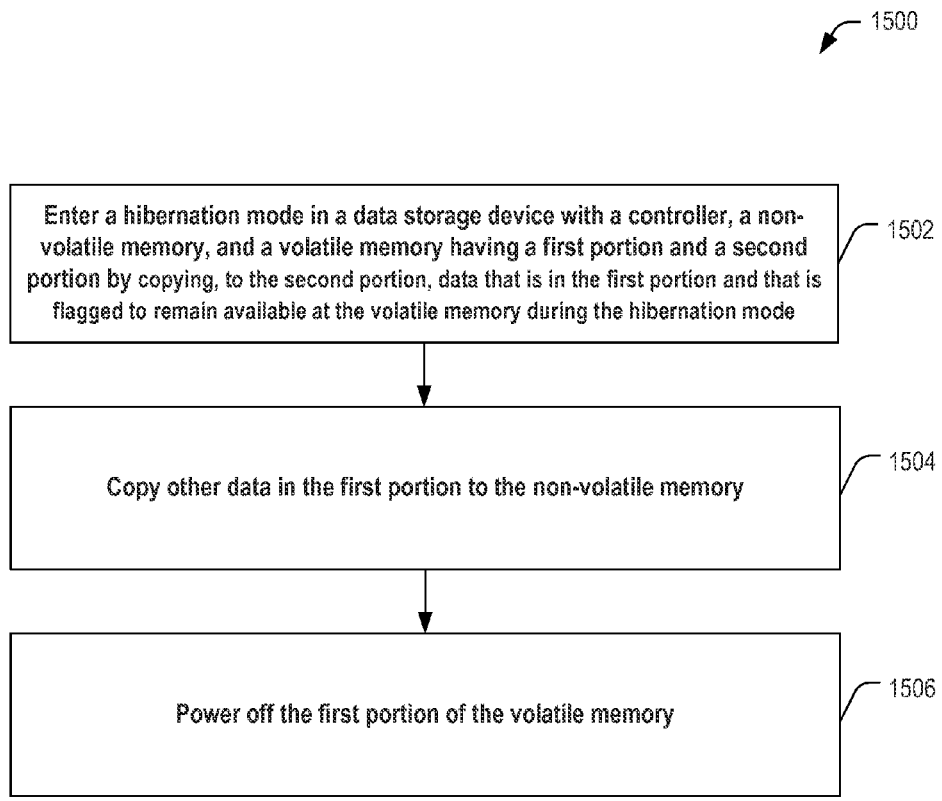
FIG. 15 is a flow diagram illustrating a particular embodiment of a method of performing a data save operation that copies data from a volatile memory to a non-volatile memory of a data storage device.

FIG. 15 depicts a flowchart that illustrates an embodiment of a method 1500 of performing a data save operation that copies data from a volatile memory to a non-volatile memory. The method 1500 may be performed in a data storage device having a controller, a non-volatile memory, and a volatile memory having a first portion and a second portion. For example, the method 1500 may be performed in the data storage device 102 of FIG. 11.

The volatile memory may enter a hibernation mode by copying, to the second portion, data that is in the first portion and that is flagged to remain available at the volatile memory during the hibernation mode, at 1502. For example, the controller 110 of FIG. 11 may be configured to copy the flagged data 1112 from the first portion 1110 of the volatile memory 112 to the second portion 1120 of the volatile memory 112.

Other data in the first portion is copied to the non-volatile memory, at 1504. For example, the other data 1114 of FIG. 11 in the first portion 1110 of the volatile memory 112 may be copied to the non-volatile memory 104.

The first portion may be powered off, at 1506. For example, the power control circuit 702 of FIG. 7 may cause the controller 110 to power off the first portion 1110 of the volatile memory 112 while maintaining power to the second portion 1120 of the volatile memory 112 and while maintaining power to the controller 110.

Powering off a portion of the volatile memory 112 while the controller 110 remains operational reduces overall power consumption of the data storage device 102. Copying the other data 1114 that is stored in the volatile memory 112 to the non-volatile memory 104 prior to powering down a portion of the volatile memory 112 allows the other data 1114 to be maintained in the non-volatile memory 104, thereby enabling the data storage device 102 to quickly revert to a state that the data storage device 102 was in prior to entering the hibernation mode. The other data 1114 may be copied from the volatile memory 112 to the non-volatile memory 104 and may be readily available to the host device 130 upon exiting the hibernation mode and without requiring participation of the host device 130 in the data storage and the data retrieval.

Figure 16:
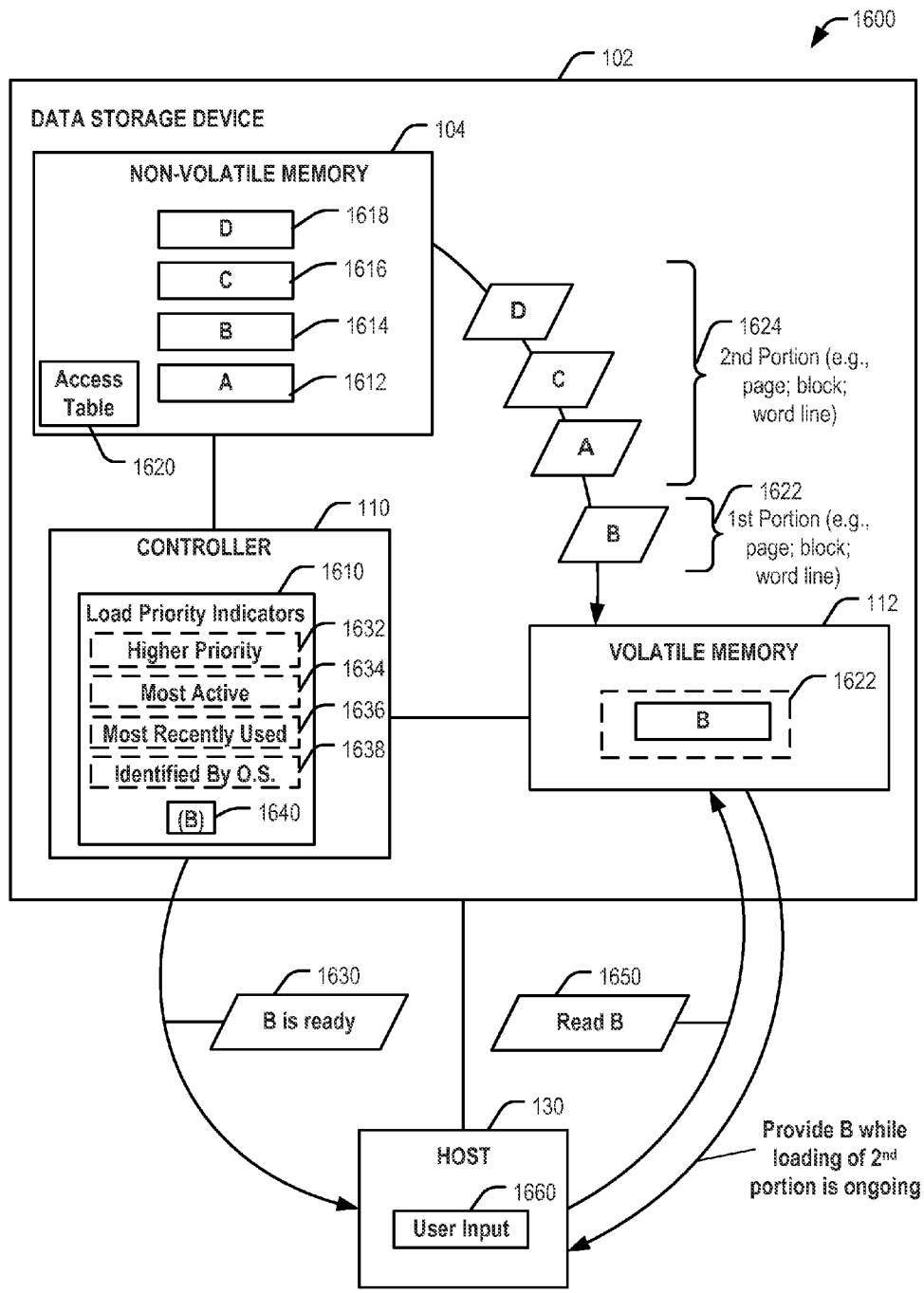
FIG. 16 is a diagram that illustrates a particular illustrative embodiment of a system to perform a data save operation that copies data from a non-volatile memory to a volatile memory.

Referring to FIG. 16, a particular illustrative embodiment of a system to perform a data save operation that copies data from a non-volatile memory to a volatile memory is depicted and generally designated 1600. The system 1600 includes the data storage device 102 coupled to the host device 130. The data storage device 102 includes the non-volatile memory 104, the controller 110, and the volatile memory 112.

The non-volatile memory 104 includes an access table 1620 and stored data, such as representative stored data A 1612, representative stored data B 1614, representative stored data C 1616, and representative stored data D 1618. The stored data 1612-1618 may correspond to data that was copied to the non-volatile memory 104 from the volatile memory 112 prior to the volatile memory 112 entering a low-power state. Each of the stored data 1612-1618 may correspond to a page, a block, or a word line of the non-volatile memory 104.

The controller 110 is configured to access one or more load priority indicators 1610 that are indicative of a data priority and to load a first portion 1622 of the stored data 1612-1618 from the non-volatile memory 104 to the volatile memory 112 according to the one or more load priority indicators 1610. For example, the one or more load priority indicators 1610 may include a higher priority indicator 1632 that indicates particular data having a higher priority than other data. The one or more load priority indicators 1610 may include a "most active" indicator 1634 that indicates particular data that is most active (i.e., most frequently used) within the data storage device 102 and having a higher priority than other data. The one or more load priority indicators 1610 may include a "most recently used" indicator 1636 that indicates particular data that has been most recently read from the data storage device 102 and having a higher priority than other data. The one or more load priority indicators 1610 may include an "identified by operating system" indicator 1638 that indicates particular data identified by an operating system of the data storage device 102 or of the host device 130 as having a higher priority than other data. The one or more load priority indicators 1610 may be based on historical data such as historical data that corresponds to host application data requests. The one or more priority indicators 1610 may be maintained and/or updated by the controller 110.

The controller 110 may be configured to receive the one or more load priority indicators 1610 from the host device 130. Alternatively, or in addition, the one or more load priority indicators 1610 may be based at least in part on user input 1660 received from the host device 130. The controller 110 may be configured to access the access table 1620 that is stored in the non-volatile memory 104 and to use the access table 1620 to determine an order of data retrieval. For example, the access table 1620 may indicate a loading order of data to be copied from the non-volatile memory 104 to the volatile memory 112 upon the data storage device 102 exiting a low-power state, such as a hibernation state as described above with respect to FIGS. 4-6. The loading order may be based on the load priority indicators 1610 that are accessible to the controller 110. For example, the controller 110 may be configured to read the one or more load priority indicators 1610 from the access table 1620 stored in the non-volatile memory 104.

The load priority indicators 1610 may also include a representative load priority indicator (B) 1640 that indicates the data B 1614. For example, the load priority indicator (B) 1640 may be associated with the higher priority load priority indicator 1632, the most active load priority indicator 1634, the most recently used load priority indicator 1636, or the identified by operating system load priority indicator 1638. The load priority indicator (B) 1640 may indicate that the data B 1614 of the stored data 1612-1618 has a higher priority than other data of the stored data 1612-1618. For example, the load priority indicator (B) 1640 may indicate that data associated with the data B 1614 in the non-volatile memory 104 has a higher priority than the data A 1612, the data C 1616, and the data D 1618.

The controller 110 is configured to cause the volatile memory 112 to exit a low-power state, such as in response to a signal from the host device 130. The controller 110 may be configured to load the first portion 1622 of the stored data 1612-1618 from the non-volatile memory 104 to the volatile memory 112 according to the one or more load priority indicators 1610. The first portion 1622 of the stored data 1612-1618 may be loaded in the volatile memory 112 according to the load priority indicators 1610. As illustrated, only the data B 1614 of the stored data 1612-1618 has a corresponding load priority indicator 1610 (i.e., the load priority indicator (B) 1640), so the first portion 1622 includes the data B 1614. The data A 1612, the data C 1616, and the data D 1618 are copied in a second portion 1624 after the first portion 1622 has been loaded to the volatile memory 112.

During operation, the controller 110 may cause the volatile memory 112 to exit a low-power state, such as in response to a signal from the host device 130. The controller 110 may load the first portion 1622 of the stored data 1612-1618 from the non-volatile memory 104 to the volatile memory 112 according to the one or more load priority indicators 1610 accessible to the controller 110. In response to completion of the loading of the first portion 1622 to the volatile memory 112 and prior to completion of loading the second portion 1624 of the stored data 1612-1618 to the volatile memory 112, the controller 110 may send a signal 1630 to indicate to the host device 130 that the volatile memory 112 is ready for use by the host device 130. For example, the controller 110 may send the signal 1630 to indicate to the host device 130 that the first portion 1622 of the stored data (i.e., the data B 1614) that has been loaded from the non-volatile memory 104 to the volatile memory 112 is ready for use by the host device 130. After receipt of the signal 1630, the host device 130 may send a read request 1650 to access the volatile memory 112. The controller 110 may be configured to process the read request 1650 and to provide the data B 1614 to the host device 130 while loading of the second portion 1622 of the stored data 1612-1618 to the volatile memory 112 is ongoing. The data storage device 102 may be in a low-power state (e.g., a hibernation state) prior to loading the first portion 1624 to the volatile memory 112 and may enter an active state after sending the signal 1630.

Loading data according to a priority scheme where higher priority data that is stored in the non-volatile memory 104 is loaded to the volatile memory 112 prior to loading other data stored in the non-volatile memory allows the host device 130 to access the higher priority data more quickly. For example, the higher priority data may include operating system codes that are used by the host device 130 to run a particular operating system platform. As another example, the higher priority data may be associated with the user input 1660 received from the host device 130. For example, the data storage device 102 may exit the hibernation state in response to a signal received from the host device 130. To illustrate, a user of the host device 130 may elect to make a phone call and may push a button of the host device 130 or may tap a touch screen of the host device 130 to initiate a request to make the phone call. Alternatively, the user may elect to exit the hibernation state to use other host device functions, such as an audio player function, a camera function, a calculator function, an alarm clock function, etc. The host device 130 may indicate to the data storage device 102 particular data to load based on the user input 1660, resulting in the load priority indicators 1610 indicating data to enable the user selected function.

As a result, loading higher priority data to the volatile memory 112 prior to loading lower priority data may enable use of the host device 130 for a user selected operation more quickly than if the stored data was not loaded according to a priority scheme. In addition, loading higher priority data to the volatile memory 112 prior to loading lower priority data may enable the data storage device 102 to exit a low-power state more quickly than if the stored data was not loaded according to a priority scheme.

Figure 17:
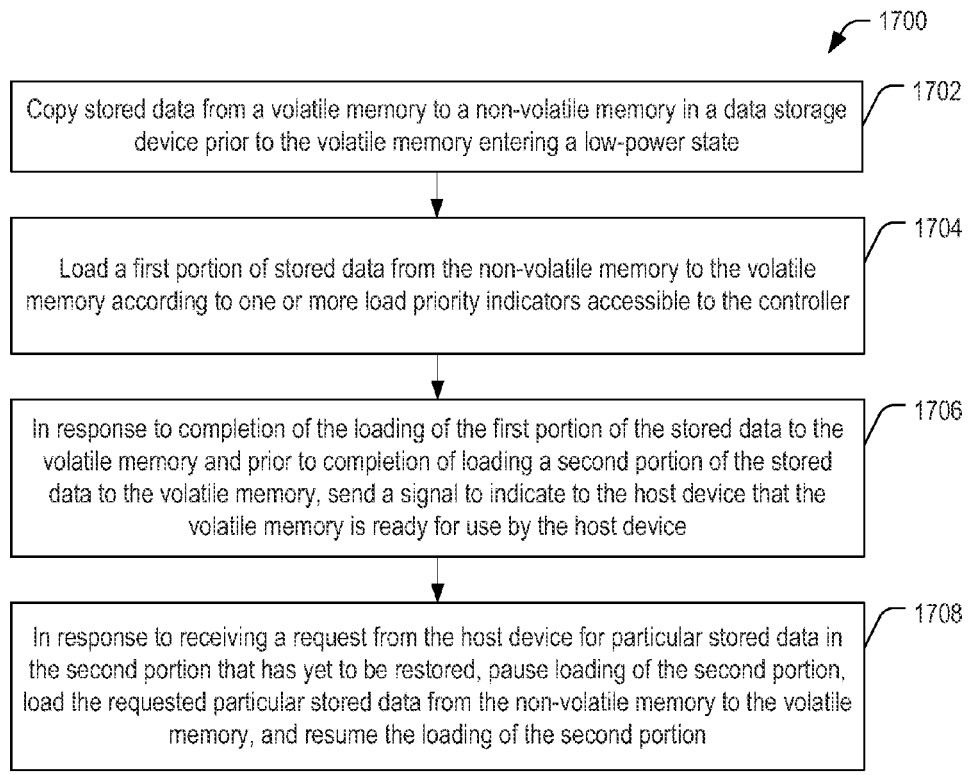
FIG. 17 is a flowchart that illustrates a particular illustrative embodiment of a method of performing a data save operation that copies data from a non-volatile memory to a volatile memory.

FIG. 17 depicts a flowchart that illustrates a particular illustrative embodiment of a method 1700 of performing a data save operation that copies data from a non-volatile memory to a volatile memory. The method 1700 may be performed in a data storage device having a controller, a non-volatile memory, and a volatile memory. For example, the method 1700 may be performed in the data storage device 102 of FIG. 16.

Data may be copied from the volatile memory to the non-volatile memory prior to the volatile memory entering a low-power state, at 1702. For example, the controller 110 of FIG. 16 may be configured to copy the stored data 1612-1618 from the volatile memory 112 to the non-volatile memory 104 prior to the volatile memory 112 entering the low-power state.

While exiting the low-power state, a first portion of stored data may be loaded from the non-volatile memory to the volatile memory according to one or more load priority indicators accessible to the controller, at 1704. For example, a user of the host device 130 may elect to make a phone call and may push a button of the host device 130 or may tap a touch screen of the host device 130 to initiate a request to make the phone call and cause the data storage device 102 to exit the low-power state. For example, the controller 110 may be configured to access the one or more load priority indicators 1610 and to load the first portion 1622 of the stored data 1612-1618 from the non-volatile memory 104 to the volatile memory 112 according to the one or more load priority indicators 1610. For example, the controller 110 may be configured to read the one or more load priority indicators 1610 from the access table 1620 stored in the non-volatile memory 104. Alternatively, the controller 110 may be configured to receive the one or more load priority indicators 1610 from the host device 130. Alternatively, or in addition, the one or more load priority indicators 1610 may be based at least in part on the user input 1660 received from the host device 130.

In response to completion of the loading of the first portion of the stored data to the volatile memory and prior to completion of loading a second portion of the stored data to the volatile memory, a signal may be sent to indicate to the host device that the volatile memory is ready for use by the host device, at 1706. For example, the controller 110 may send the signal 1630 to indicate to the host device 130 that the loading of the first portion 1622 of the stored data 1612-1618 is complete and is ready for use by the host device 130 prior to completion of loading the second portion 1624 of the stored data 1612-1618.

In response to receiving a request from the host device for particular stored data in the second portion, the loading of the second portion may be paused, the requested particular stored data may be loaded from the non-volatile memory to the volatile memory, and the loading of the second portion may be resumed, at 1708. For example, while loading of the second portion 1624 is ongoing, the host device 130 may send a request to the data storage device 102 for particular stored data in the second portion 1624 that has yet to be loaded from the non-volatile memory 104 to the volatile memory 112. To illustrate, while the stored data A 1612 is being loaded from the non-volatile memory 104 to the volatile memory 112, the host device 130 may send a request for the stored data C 1616 which has yet to be loaded to the volatile memory 112. In response to receiving the request for the stored data C 1616 while loading the stored data A 1612, the controller may pause the loading of the stored data A 1612 and may cause the stored data C 1616 to be retrieved and loaded "out of order" from the non-volatile memory 104 to the volatile memory 112. After the stored data C 1616 is retrieved and loaded from the non-volatile memory 104 to the volatile memory 112, the controller 110 may cause the loading of the stored data A 1612 to resume.

Allowing data in the second portion 1624 to be loaded out of order upon request of the host device 130 allows the host device 130 to access requested data more quickly as compared to loading the requested data in the second portion 1624 in order (e.g., according to a previously determined order). For example, the higher priority data may include operating system codes that are used by the host device 130 to run a particular operating system platform. As another example, the higher priority data may be associated with the user input 1660 received from the host device 130. For example, a user of the host device 130 may elect to make a phone call. As a result, use of a particular function (e.g., a telephone function, an audio player function, etc.) of the host device 130 may be available more quickly as compared to waiting for sequential load ordering of the data.

Figure 18:
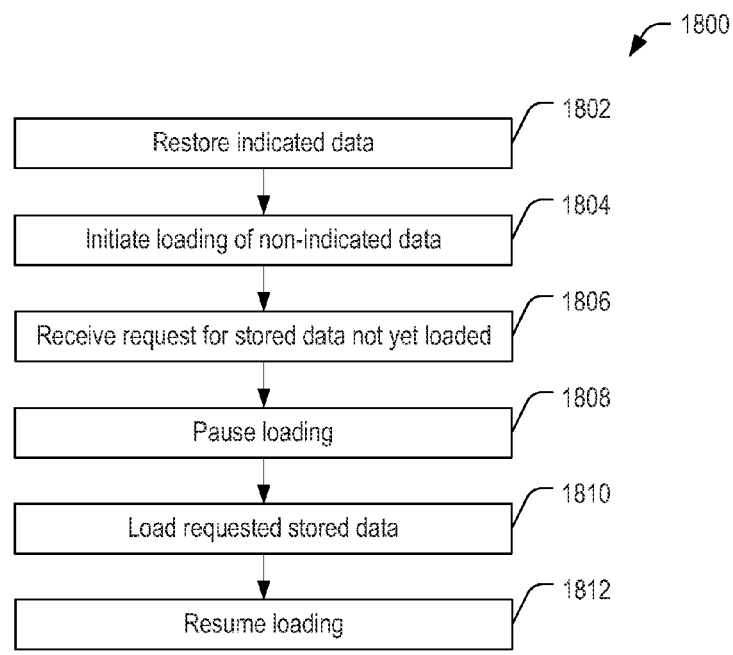
FIG. 18 is a flowchart that illustrates another embodiment of a method of performing a data save operation that copies data from a non-volatile memory to a volatile memory.

FIG. 18 depicts a flowchart that illustrates another embodiment of a method 1800 of performing a data save operation that copies data from a non-volatile memory to a volatile memory. The method 1800 may be performed in a data storage device having a controller, a non-volatile memory, and a volatile memory. For example, the method 1800 may be performed in the data storage device 102 of FIG. 16.

Data may be copied from the volatile memory 112 to the non-volatile memory 104 prior to the volatile memory 112 entering a low-power state. For example, the controller 110 of FIG. 16 may be configured to copy the stored data 1612-1618 from the volatile memory 112 to the non-volatile memory 104 prior to the volatile memory 112 entering the low-power state. At a later time, upon exiting the low-power state (e.g., a user of the host device 130 may elect to make a phone call and cause the data storage device 102 to exit the low-power state), indicated data may be restored, at 1802. The indicated data may correspond to load priority indicators, such as the load priority indicators 1610 of FIG. 16. For example, data copied from the volatile memory 112 to the non-volatile memory 104 prior to the volatile memory 112 entering a low-power state may be restored to the volatile memory 112 according to a priority scheme in response to the volatile memory 112 exiting the low-power state. To illustrate, the first portion 1622 (i.e., higher priority data) may be loaded from the non-volatile memory 104 to the volatile memory 112.

Loading of non-indicated data may be initiated, at 1804. For example, in response to completion of the loading of the first portion 1622 from the non-volatile memory 104 to the volatile memory 112, loading of the second portion 1624 (i.e., data with a lower priority than the higher priority data in the first portion) may be initiated.

A request for stored data not yet loaded may be received, at 1806. For example, while loading of the second portion 1624 is ongoing, the host device 130 may send a request to the data storage device 102 for particular stored data (in the second portion 1624) that has yet to be loaded from the non-volatile memory 104 to the volatile memory 112. To illustrate, while the stored data A 1612 is being loaded from the non-volatile memory 104 to the volatile memory 112, the host device 130 may send a request for the stored data D 1618 which has yet to be loaded to the volatile memory 112.

Loading the stored data may be paused, at 1808. For example, in response to receiving the request for the stored data D 1618 while loading the stored data A 1612, the controller may pause the loading of the stored data A 1612.

The requested stored data may be loaded, at 1810. For example, the controller 110 may cause the stored data D 1618 to be retrieved and loaded "out of order" from the non-volatile memory 104 to the volatile memory 112.

Loading the stored data may be resumed, at 1812. For example, after the controller 110 causes the stored data D 1618 to be retrieved and loaded out of order from the non-volatile memory 104 to the volatile memory 112, the controller 110 may cause the loading of the stored data A 1612 to resume. The stored data D 1618 may be removed from the loading scheme to avoid the stored data D 1618 being loaded twice.

Allowing data in the second portion 1624 to be loaded out of order upon request of the host device 130 allows the host device 130 to access requested data more quickly as compared to loading the requested data in the second portion 1624 according to a sequential load scheme (e.g., loading by numerical address order), thereby enabling use of a particular function of the host device 130 more quickly.

Figure 19:
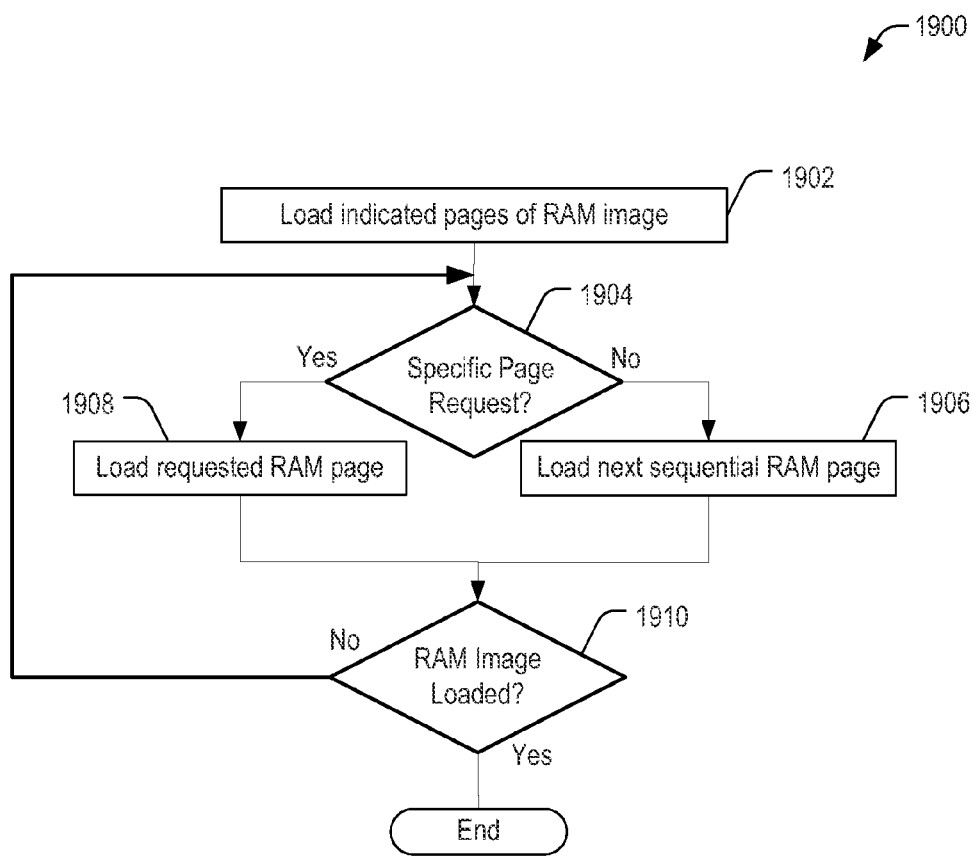
FIG. 19 is a flowchart that illustrates another embodiment of a method of performing a data save operation that copies data from a non-volatile memory to a volatile memory.

FIG. 19 depicts a flowchart that illustrates another embodiment of a method 1900 of performing a data save operation that copies data from a non-volatile memory to a volatile memory. The method 1900 may be performed in a data storage device having a controller, a non-volatile memory, and a volatile memory. The non-volatile memory may be a flash memory and the volatile memory may be a random access memory (RAM). For example, the method 1900 may be performed in the data storage device 102 of FIG. 16.

Data may be copied from the volatile memory (i.e., RAM) 112 to the non-volatile memory 104 prior to the volatile memory 112 entering a low-power state. For example, the controller 110 of FIG. 16 may be configured to copy the stored data 1612-1618 from the volatile memory 112 to the non-volatile memory 104 prior to the volatile memory 112 entering the low-power state. Each of the stored data 1612-1618 may correspond to a page, a block, or a word line of the non-volatile memory 104. Upon or in connection with exiting the low-power state (e.g., a user of the host device 130 may elect to make a phone call and cause the data storage device 102 to exit the low-power state), indicated pages of a RAM image may be loaded, at 1902. The indicated pages may correspond to load priority indicators, such as the load priority indicators 1610 of FIG. 16. For example, data copied from the volatile memory 112 to the non-volatile memory 104 prior to the volatile memory 112 entering a low-power state may be restored to the volatile memory 112 according to a priority scheme in response to the volatile memory 112 exiting the low-power state. To illustrate, the first portion 1622 (i.e., higher priority data) may be loaded from the non-volatile memory 104 to the volatile memory 112. After the first portion 1622 is loaded, the second portion 1624 may begin loading.

After the indicated pages of the RAM image have been loaded, the remaining pages of the RAM image may be loaded according to a sequential load order (e.g., the stored data A 1612, the stored data C 1616, the stored data D 1618). However, if the host device 130 requests a specific page of the RAM image, that page of the RAM image may be loaded out of order to allow the host device 130 to perform a particular function more quickly. Therefore, a determination may be made whether any specific page of the RAM image has been requested, at 1904. If a specific page of the RAM image has not been requested, then a next sequential RAM page may be loaded, at 1906. For example, if a specific page of the RAM image has not been requested, then a first sequential page (i.e., stored data A 1612) of the second portion 1624 may be loaded.

Otherwise, if a specific page of the RAM image has been requested, then the requested RAM page may be loaded "out of order", at 1908. For example, while loading of the second portion 1624 is ongoing, the host device 130 may send a request to the data storage device 102 for particular stored data in the second portion 1624 that has yet to be loaded from the non-volatile memory 104 to the volatile memory 112. To illustrate, while the stored data A 1612 is being loaded from the non-volatile memory 104 to the volatile memory 112, the host device 130 may send a request for the stored data D 1618 which has yet to be loaded to the volatile memory 112. In response to receiving the request for the stored data D 1618 while loading the stored data A 1612, the controller 110 may complete the loading of the stored data A 1612 and may cause the stored data D 1616 to be retrieved and loaded "out of order" from the non-volatile memory 104 to the volatile memory 112.

After each RAM page has been loaded, a determination may be made whether the entire RAM image has been loaded, at 1910. For example, the controller 110 may be configured to determine whether the stored data 1612-1618 has completed loading from the non-volatile memory 104 to the volatile memory 112. If the stored data 1612-1618 has not completed loading, the method returns to 1904. If the stored data 1612-1618 has completed loading, the method ends.

Allowing RAM image data (e.g., a RAM page) in the second portion 1624 to be loaded out of order upon request of the host device 130 allows the host device 130 to access requested RAM image data more quickly as compared to loading the requested data in the second portion 1624 according to a sequential load scheme (e.g., loading by numerical address order), thereby enabling use of a particular function of the host device 130 more quickly. For example, the higher priority data may be associated with the user input 1660 received from the host device 130. For example, a user of the host device 130 may elect to make a phone call. As a result, use of a particular function (e.g., a telephone function, an audio player function, etc.) of the host device 130 may be available more quickly as compared to waiting for sequential load ordering of the RAM image data.

Figure 20:
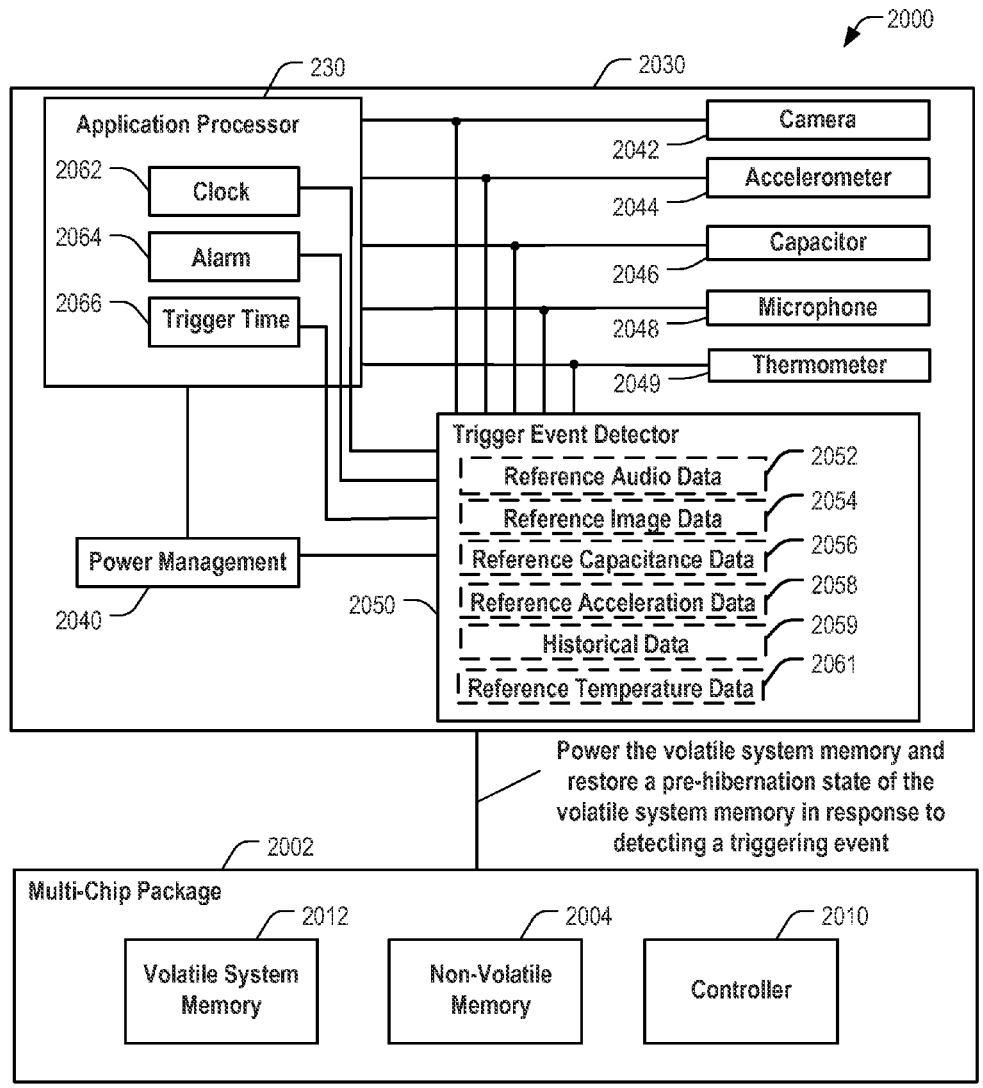
FIG. 20 is a block diagram that illustrates a particular embodiment of a system to exit a hibernation mode in response to detecting a triggering event.

Referring to FIG. 20, a particular illustrative embodiment of a system to exit a hibernation mode in response to detecting a triggering event is depicted and generally designated 2000. The system 2000 includes an electronic device 2030 coupled to a multi-chip package 2002. The multi-chip package 2002 includes a non-volatile memory 2004, a controller 2010, and a volatile system memory 2012. The non-volatile memory 2004 may be a non-volatile memory of a flash device, such as a NAND flash device, a NOR flash device, or any other type of flash device. The volatile system memory 2012 may be a random access memory (RAM) to store data and instructions for the application processor 230. The multi-chip package 2002 may correspond to the data storage device 102 of FIG. 1.

Although the system 2000 is described as including the volatile memory 112 and the non-volatile memory 104 in the multi-chip package 2002, in other embodiments, the volatile memory 112 and the non-volatile memory 104 may not be in a multi-chip package. For example, the volatile memory 112 and the non-volatile memory 104 may both be embedded in the electronic device 2030. As another example, one or more of the volatile memory 112 and the non-volatile memory 104 may be removably coupled to the electronic device 2030 but in separate packages.

The electronic device 2030 may include a mobile telephone, a music or video player, a gaming console, an electronic book reader, a personal digital assistant (PDA), a computer, such as a laptop computer, a notebook computer, or a tablet, any other electronic device, or any combination thereof. The electronic device 2030 may correspond to the host device 130 of FIG. 1. The electronic device 2030 includes the application processor 230 of FIG. 2, a trigger event detector 2050, and a power management device 2040. The application processor 230 includes a system clock 2062, an alarm 2064, and a trigger time device 2066.

The power management device 2040 may be configured to control power supplied to one or more components of the system 2000. For example, the power management device 2040 may cause the volatile system memory 2012 to be powered off to enter the low-power state and to cause the volatile system memory 2012 to be powered on while exiting the low-power state. The power management device 2040 is responsive to the trigger event detector 2050. For example, the power management device 2040 may cause power to be supplied to the volatile system memory 2012 in response to receiving an indication from the trigger event detector 2050 that a triggering event has been detected.

The trigger event detector 2050 is configured to detect the triggering event. For example, the triggering event may be an event that indicates that the electronic device 2030 is to exit a low-power state, such as a hibernation mode, where the volatile system memory 2012 is powered off. For example, the electronic device 2030 may have entered into the hibernation mode during a period of inactivity, and the triggering event may indicate an end of the period of inactivity. For example, the triggering event may be an event that indicates motion of the electronic device 2030, human touch of the electronic device 2030, a change in an audio environment of the electronic device 2030, a change in a temperature environment of the electronic device 2030, any other event that anticipates the end of the period of inactivity of the electronic device 2030, or any combination thereof.

To detect a triggering event, the trigger event detector 2050 may receive a signal from a sensor of the electronic device 2030 (or coupled to the electronic device 2030, such as an attached microphone or webcam) and detect that the signal satisfies a trigger condition. The signal may include digital data generated by the sensor or analog information received from by the sensor. The sensor may be a low-power consuming device to reduce power consumption in the hibernation mode.

The trigger event detector 2050 may receive a signal from a camera 2042 of the electronic device 2030. The signal from the camera 2042 may correspond to image data captured by the camera 2042 while the electronic device 2030 is in the hibernation mode. The trigger condition may correspond to detection of device movement by detecting a difference between the signal from the camera 2042 and reference image data 2054. The reference image data 2054 may correspond to image data of the camera 2042 captured while the electronic device 2030 is in a static (e.g., non-moving) position. For example, the camera 2042 may capture a still image while the electronic device is in the hibernation mode. Motion of the electronic device 2030 may be detected by comparing the signal from the camera 2042 to the reference image data 2054 and, based on the comparison, the trigger event detector 2050 may indicate that the electronic device 2030 is to exit the hibernation mode.

For example, the electronic device (e.g., a mobile telephone, a music player, etc.) may have entered the hibernation mode during a period of inactivity, such as when a user places the electronic device on a nightstand prior to retiring for the evening or when the user places the electronic device 2030 in a purse or in a pocket. When the user elects to use a particular function of the electronic device 2030 (e.g., to make a phone call) the user may pick up the electronic device 2030. The trigger event detector 2050 may detect the motion of the electronic device 2030 by comparing the signal from the camera 2042 to the reference image data 2052 and, based on the comparison, the trigger event detector 2050 may cause the electronic device 2030 to begin to exit the hibernation mode prior to, and in anticipation of, the user pushing a button of the electronic device 130 or tapping a touch screen of the electronic device 130 to initiate the particular function of the electronic device 2030. As a result, the user may use the electronic device 2030 for the particular function more quickly than if the user had to wait for the button to be pushed or the touch screen to be tapped before the electronic device 2030 begins exiting the hibernation mode. A latency of the electronic device 2030 to enter an active state in response to a user input (e.g., pushing a button or tapping a touch screen on the electronic device to make a phone call) may therefore be reduced as compared to a device waiting for the button to be pushed or the touch screen to be tapped before beginning to exit the hibernation mode. In addition, a latency of the electronic device 2030 to enter an active state in response to a user input may be reduced as compared to powering the volatile system memory and restoring the pre-hibernation state after the user input is received.

The trigger event detector 2050 may be configured to receive a signal from an accelerometer 2044 of the electronic device 2030. The signal from the accelerometer 2044 may correspond to acceleration data sensed by the accelerometer 2044 while the electronic device 2030 is in the hibernation mode. The trigger condition may correspond to a difference between the signal from the accelerometer 2044 and reference acceleration data 2058. The reference acceleration data 2058 may correspond to acceleration data of the accelerometer 2044 while the electronic device 2030 is in a static (e.g., non-moving) position, such as an acceleration due to gravity. Motion of the electronic device 2030 may be detected by comparing the signal from the accelerometer 2044 to the reference acceleration data 2058 and, based on the comparison, the trigger event detector 2050 may indicate that the electronic device 2030 is to exit the hibernation mode.

The trigger event detector 2050 may be configured to receive a signal from a capacitor 2046 of the electronic device 2030. The signal from the capacitor 2046 may correspond to capacitance data sensed by the capacitor 2046 indicating whether the electronic device 2030 is being touched by a user. The trigger condition may correspond to a difference between the signal from the capacitor 2046 and reference capacitance data 2056. The reference capacitance data 2056 may correspond to capacitance data of the capacitor 2046 while the electronic device 2030 is not being touched by or in the grasp of a user. Human touch of the electronic device 2030 may be detected by comparing the signal from the capacitor 2046 to the reference capacitance data 2056 and based on the comparison, the trigger event detector 2050 may indicate that the electronic device 2030 is to exit the hibernation mode.

For example, the electronic device 2030 may have entered the hibernation mode during a period of inactivity (e.g., placed on a night stand, placed in a purse or pocket, etc). When a user elects to use the electronic device 2030 for a particular function (e.g., to make a phone call) the user may pick up the electronic device 2030. The trigger event detector 2050 may detect the touch of the electronic device 2030 by the user by comparing the signal from the capacitor 2046 to the reference capacitance data 2056, and based on the comparison, the trigger event detector 2050 may cause the electronic device 2030 to begin exiting the hibernation mode prior to the user pushing a button of the electronic device 2030 or tapping a touch screen of the electronic device 2030 to initiate a request to make the phone call.

The trigger event detector 2050 may be configured to receive a signal from a microphone 2048 of the electronic device 2030. The signal from the microphone 2048 may correspond to audio data sensed by the microphone 2048 while the electronic device 2030 is in the hibernation mode. The trigger condition may correspond to a difference between the signal from the microphone 2048 and reference audio data 2052. The reference audio data 2052 may correspond to ambient noise while the electronic device 2030 is entering the hibernation mode. An audio level above a threshold level may be detected by comparing the signal from the microphone 2048 to the reference audio data 2052, and based on the comparison, the trigger event detector 2050 may indicate that the electronic device 2030 is to exit the hibernation mode.

For example, the electronic device (e.g., a mobile telephone, a music player, etc.) may have entered the hibernation mode during a period of inactivity (e.g., placed on a night stand, placed in a purse or a pocket, etc). Prior to a user electing to use the electronic device 2030 for a particular function (e.g., to make a phone call), an audio environment may change (e.g., the user may speak, an audible alarm may go off, etc.) prior to the user picking up the electronic device 2030. The trigger event detector 2050 may detect the audio level proximate to the electronic device 2030 by receiving a signal from the microphone 2048. By comparing the signal from the microphone 2048 to the reference audio data 2052, the trigger event detector 2050 may cause the electronic device 2030 to begin exiting the hibernation mode prior to the user interacting with the electronic device 2030 (e.g., pushing a button of the electronic device 130 or tapping a touch screen of the electronic device 130) to initiate a request to make the phone call. As a result, the user may use the electronic device 2030 for the particular function more quickly than if the user had to wait for the button to be pushed or the touch screen to be tapped before the electronic device 2030 begins exiting the hibernation mode.

The trigger event detector 2050 may be configured to receive a signal from a temperature sensor, such as a thermometer 2049 of the electronic device 2030. The signal from the thermometer 2049 may correspond to temperature data sensed by the thermometer 2049 while the electronic device 2030 is in the hibernation mode. The trigger condition may correspond to a difference between the signal from the thermometer 2049 and reference temperature data 2061. The reference temperature data 2061 may correspond to an ambient temperature or device enclosure temperature while the electronic device 2030 is entering the hibernation mode. A temperature level above a threshold level may be detected by comparing the signal from the thermometer 2049 to the reference temperature data 2061, and based on the comparison, the trigger event detector 2050 may indicate that the electronic device 2030 is to exit the hibernation mode.

For example, the electronic device 2030 may have entered the hibernation mode during a period of inactivity (e.g., placed in a purse or pocket, etc). When a user elects to use the electronic device 2030 for a particular function (e.g., to make a phone call), the user may remove the electronic device 2030 from the purse or the pocket. The trigger event detector 2050 may detect a change in temperature by comparing the signal from the thermometer 2049 to the reference temperature data 2061 and, based on the comparison, the trigger event detector 2050 may cause the electronic device 2030 to begin exiting the hibernation mode prior to the user pushing a button of the electronic device 2030 or tapping a touch screen of the electronic device 2030 to initiate a request to make the phone call.

The triggering event may be an event that anticipates the end of the period of inactivity of the electronic device 2030 without use of any of the sensors 2042-2049. For example, it may be beneficial to exit a hibernation mode prior to an alarm of the electronic device 2030 going off. For example, to detect the triggering event, the trigger event detector 2050 may receive an indication corresponding to a difference between an alarm time and a system clock time and may detect that the difference between the alarm time and the system clock time satisfies a pre-alarm wakeup trigger condition. For example, the system clock 2062 may be a running timer. A value of the alarm 2064 (e.g., an alarm time) may be compared to a value of the system clock 2062 (e.g., a system clock time). Based on the comparison between the system clock time and the alarm time, the triggering event may be detected. For example, if the outcome of the comparison less than or equals a pre-alarm amount of time stored in the trigger time device 2066, the triggering event may be detected. The trigger time device 2066 may include one or more registers or other data storage devices storing a value indicating a pre-alarm amount of time To illustrate, a user of the electronic device 2030 may set the alarm 2064 to a particular time and the pre-alarm amount of time may be pre-set (e.g., five seconds). The alarm time may be compared to the system clock time of the system clock 2062. If the comparison between the alarm time and the system clock time is less than or equals the pre-alarm amount of time (e.g., the alarm time is within five seconds of the system clock time), the triggering event is detected and the electronic device 2030 begins to exit the hibernation mode prior to the alarm 2064 being initiated.

The trigger event detector 2050 may detect a triggering event that may anticipate the end of the period of inactivity of the electronic device 2030 by receiving an indication corresponding to a difference between a predicted use time of the electronic device 2030 and a system clock time, where the predicted use time is based on historical data. The triggering event detector 2050 may detect that the difference between the predicted use time and the system clock time satisfies a pre-use wakeup trigger condition. For example, historical data 2059 may correspond to historical usage (e.g., a pattern of usage) of particular functions of the electronic device 2030. For example, the historical data 2059 may correspond to a user of the electronic device 2030 setting the alarm 2064 to the same time every weekday. As another example, the historical data 2059 may correspond to a user of the electronic device 2030 making a phone call at approximately 9:00 A.M. every day. A value of the historical data 2059 (e.g., a phone call is made at approximately 9:00 AM every day) may be compared to a value of the system clock 2062 (e.g., a system clock time).

Based on the comparison between the system clock time and the value of the historical data 2059, the triggering event may be detected. For example, if the value of the comparison is less than or equals a pre-alarm amount of time stored in the trigger time device 2066, the triggering event may be detected. To illustrate, the historical data 2059 may indicate that a user of the electronic device 2030 makes a phone call at approximately 9:00 AM every day and the pre-alarm amount of time may be five seconds. The historical data 2059 may be compared to the system clock time of the system clock 2062. If the comparison between the historical data 2059 (e.g., a phone call at approximately 9:00 AM every day) and the system clock time is less than or equals the pre-alarm amount of time stored in the trigger time device 2066 (e.g., the system clock time is within five seconds of the 9:00 AM value of the historical data 2059), the triggering event is detected and the electronic device 2030 begins to exit the hibernation mode. Beginning to exit the hibernation mode prior to an anticipated use based on the historical data 2059 may allow use of the electronic device 2030 by a user for a particular function (e.g., to make a phone call) more quickly than if the electronic device 2030 waited for the user to push a button or to touch a touch screen on the electronic device 2030 before beginning to exit the hibernation mode.

During operation, the electronic device 2030 may enter into the hibernation mode during a period of inactivity. After entering into the hibernation mode, a triggering event (e.g., an event that indicates motion of the electronic device 2030, an event that indicates a human touch of the electronic device 2030, an event that indicates a change in an audio environment of the electronic device 2030, an event that indicates a change in a temperature environment of the electronic device 2030, or an event that anticipates the end of the period of inactivity of the electronic device 2030) may be detected. For example, the trigger event detector 2050 may receive a signal from a sensor (e.g., the camera 2042, the accelerometer 2044, the capacitor 2046, the microphone 2048, or the thermometer 2049) of the electronic device 2030 and may detect that the signal satisfies a trigger condition. Alternatively, the trigger event detector 2050 may receive an indication corresponding to a difference between an alarm time (e.g., a value of the alarm 2064) and a system clock time (e.g., a value of the system clock 2062), and detect that the difference between the alarm time and the system clock time satisfies a pre-alarm wakeup trigger condition. Alternatively, the trigger event detector 2050 may receive an indication corresponding to a difference between a predicted use time (e.g., a phone call made by a user of the electronic device 2030 at approximately 9:00 AM every day) of the electronic device 2030 and a system clock time (e.g., a value of the system clock 2062).

In response to detecting the triggering event, the hibernation mode may be exited. While exiting the hibernation mode, the volatile system memory 2012 may be powered and a pre-hibernation state of the volatile system memory 2012 may be restored. For example, in response to detecting the triggering event, the trigger event detector 2050 may send a signal to the power management device 2040 to cause the volatile system memory 2012 to be powered and a pre-hibernation state of the volatile system memory 2012 to be restored. Restoring the pre-hibernation state of the volatile system memory 2012 may include copying data from the non-volatile memory 2004 to the volatile system memory 2012 to restore data to the volatile system memory 2012.

Beginning to exit the hibernation mode prior to an end of the period of inactivity may allow use of the electronic device 2030 by a user for a particular function (e.g., to make a phone call) more quickly than if the electronic device 2030 waits for a button to be pushed or a touch screen to be tapped on the electronic device 2030 before beginning to exit the hibernation mode to initiate the phone call. As a result, a latency of the electronic device 2030 to enter an active state in response to a user input (e.g., pushing a button or tapping a touch screen on the electronic device 2030 to make a phone call) may be reduced as compared to an electronic device that waits for the button to be pushed or the touch screen to be tapped before beginning to exit the hibernation mode.

In addition, overall power consumption of the electronic device 2030 may be reduced by powering off the volatile system memory 2012 while in the hibernation mode even though triggering mechanisms (e.g., the sensors 2042-2049, the clock 2062, the alarm 2064, the trigger time device 2066, and the trigger event detector 2050) may remain powered during the hibernation mode. For example, one or more of the triggering mechanisms, such as the accelerometer 2044, may be a low-power consuming device.

Figure 21:
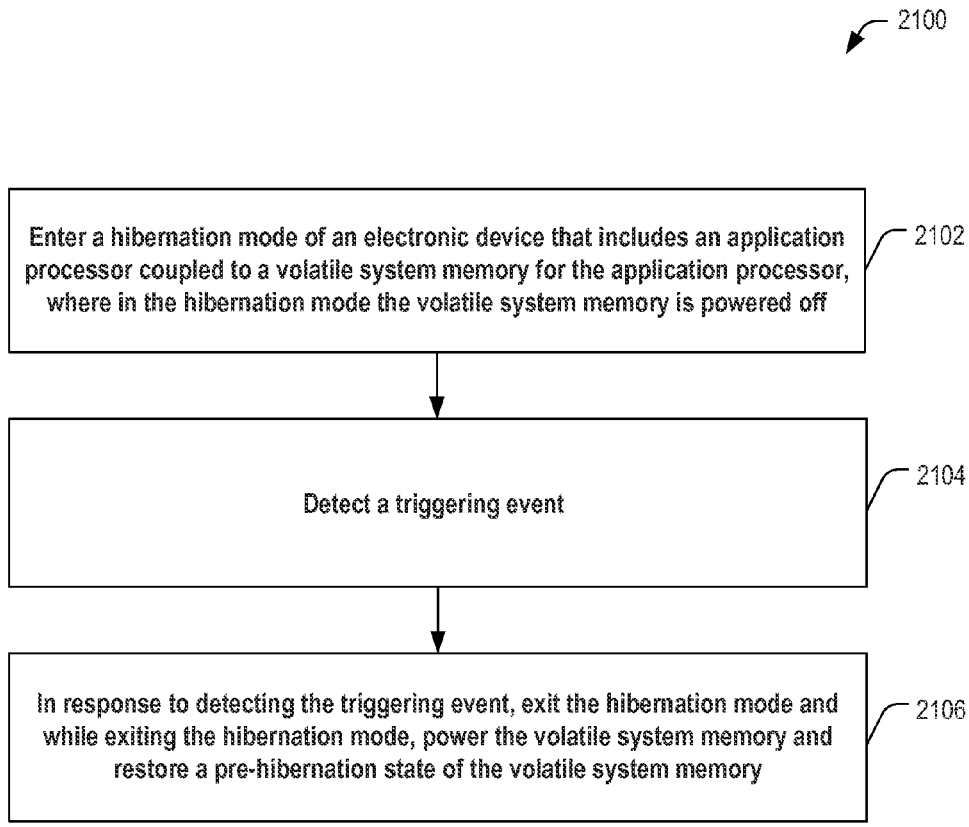
FIG. 21 is a flowchart that illustrates a particular illustrative embodiment of a method of exiting a hibernation mode in response to detecting a triggering event.

FIG. 21 depicts a flowchart that illustrates an embodiment of a method 2100 of exiting a hibernation mode in response to detecting a triggering event. The volatile system memory may be within a multi-chip package that includes a non-volatile memory and a controller, such as the multi-chip package 2002 of FIG. 20. The method 2100 may be performed by an electronic device including an application processor coupled to the volatile system memory to store data and instructions for the application processor. For example, the method 2100 may be performed by the electronic device 2030 of FIG. 20.

The electronic device may enter a hibernation mode, at 2102. For example, the electronic device 2030 may enter into the hibernation mode during a period of inactivity. When in the hibernation mode, the volatile system memory 2012 is powered off. For example, the application processor 230 may indicate that the electronic device 2030 is to enter the hibernation mode. Entering the hibernation mode may include copying data from the volatile system memory 2012 to the non-volatile memory 2004 and the volatile system memory 2012 being powered off by the power management device 2040 of FIG. 20.

A triggering event may be detected, at 2104. For example, the trigger event detector 2050 of FIG. 20 may receive a signal from a sensor of the electronic device 2030 and detect that the signal satisfies a trigger condition. The triggering event may be an event that indicates motion of the electronic device 2030, an event that indicates a human touch of the electronic device 2030, an event that indicates a change in an audio environment of the electronic device 2030, an event that indicates a change in a temperature environment of the electronic device 2030, an event that anticipates the end of the period of inactivity of the electronic device 2030, one or more events that may indicate an ending of a period of inactivity, or any combination thereof.

For example, the trigger event detector 2050 may receive a signal from a sensor of the electronic device 2030 (e.g., the camera 2042, the accelerometer 2044, the capacitor 2046, the microphone 2048, the thermometer 2049) and the trigger condition may correspond to a difference between the signal and respective reference data (e.g., the reference image data 2054, the reference acceleration data 2058, the reference capacitance data 2056, the reference audio data 2052, or the reference temperature data 2061).

Alternatively, the trigger event detector 2050 may receive an indication corresponding to a difference between an alarm time and a system clock time and detect that the difference between the alarm time and the system clock time satisfies a pre-alarm wakeup trigger condition. For example, a value of the alarm 2064 (e.g., the alarm time) may be compared to a value of the system clock 2062 (e.g., the system clock time). If the value of the comparison is less than or equals the pre-alarm amount of time stored in the trigger time device 2066, the triggering event may be detected. Alternatively, the trigger event detector 2050 may receive an indication corresponding to a difference between a predicted use time of the electronic device 2030 and a system clock time, where the predicted use time is based on historical data. The triggering event detector 2050 may detect that the difference between the predicted use time and the system clock time satisfies a pre-use wakeup trigger condition. For example, a value of the historical data 2059 (e.g., a phone call is made at approximately 9:00 AM every day) may be compared to a value of the system clock 2062 (e.g., a system clock time). If the value of the comparison is less than or equals the pre-alarm amount of time stored in the trigger time device 2066, the triggering event may be detected.

In response to detecting the triggering event, the hibernation mode may be exited, at 2106. While exiting the hibernation mode, the volatile system memory may be powered and a pre-hibernation state of the volatile system memory may be restored. For example, in response to detecting motion of the electronic device 2030, detecting a human touch of the electronic device 2030, detecting a change in an audio environment of the electronic device 2030, or detecting anticipation of an end of a period of inactivity of the electronic device 2030, the volatile system memory 2012 may be powered and a pre-hibernation state of the volatile system memory 2012 may be restored. Restoring the pre-hibernation state of the volatile system memory 2012 may include copying data from the non-volatile memory 2004 to the volatile system memory 2012 to restore data to the volatile system memory 2012.

Exiting the hibernation mode prior to an end of a period of inactivity may allow use of the electronic device 2030 by a user for a particular function (e.g., to make a phone call) more quickly than if the electronic device 2030 waited for a button to be pushed or a touch screen to be tapped on the electronic device 2030 before beginning to exit the hibernation mode.

The triggering events described above may be applied as triggers for additional processes which may enhance a user experience provided by the electronic device 2030. For example, the triggering events may be applied as triggers to automatically turn on a display of the electronic device 2030. As another example, the triggering events may be applied as triggers to provide "dormant" notifications, such as providing a notification for a prior unnoticed text message. In addition, although the camera 2042, the accelerometer 2044, the capacitor 2046, the microphone 2048, and the thermometer 2049 are illustrated as examples in FIG. 20, it should be understood that one or more other sensors may be used to detect a triggering event.

Although various components depicted herein are illustrated as block components and described in general terms, such components may include one or more microprocessors, state machines, or other circuits configured to enable a trigger event detector, such as the trigger event detector 2050 of FIG. 20, to perform the particular functions attributed to such components, or any combination thereof. For example, the trigger event detector 2050 of FIG. 20 may represent physical components, such as controllers, processors, state machines, logic circuits, or other structures to detect a triggering event, and in response to detecting the triggering event, to cause the electronic device 2030 to exit the hibernation mode, where while exiting the hibernation mode, the volatile system memory 2012 is powered and a pre-hibernation state of the volatile system memory 2012 is restored.

The trigger event detector 2050 may be implemented using a microprocessor or microcontroller programmed to generate control information and to initiate and perform detection of the triggering event, and in response to detecting the triggering event, causing the electronic device 2030 to exit the hibernation mode. While exiting the hibernation mode, the volatile system memory 2012 is powered and a pre-hibernation state of the volatile system memory 2012 is restored. In a particular embodiment, the trigger event detector 2050 includes a processor executing instructions that are stored at the non-volatile memory 2004. Alternatively, or in addition, executable instructions that are executed by the processor may be stored at a separate memory location that is not part of the non-volatile memory 2004, such as at a read-only memory (ROM).

In a particular embodiment, the data storage device 102 may be a portable device configured to be selectively coupled to one or more external devices. For example, the data storage device 102 may be a removable device such as a universal serial bus (USB) flash drive or removable memory card. However, in other embodiments, the data storage device 102 may be attached or embedded within one or more host devices, such as within a housing of a portable communication device. For example, the data storage device 102 may be within a packaged apparatus, such as a wireless telephone, a personal digital assistant (PDA), a gaming device or console, a portable navigation device, a computer, or other device that uses internal non-volatile memory. In a particular embodiment, the data storage device 102 includes a non-volatile memory, such as a Flash memory (e.g., NAND, NOR, Multi-Level Cell (MLC), Divided bit-line NOR (DINOR), AND, high capacitive coupling ratio (HiCR), asymmetrical contactless transistor (ACT), or other Flash memories), an erasable programmable read-only memory (EPROM), an electrically-erasable programmable read-only memory (EEPROM), a read-only memory (ROM), a one-time programmable memory (OTP), or any other type of memory.

The illustrations of the embodiments described herein are intended to provide a general understanding of the various embodiments. Other embodiments may be utilized and derived from the disclosure, such that structural and logical substitutions and changes may be made without departing from the scope of the disclosure. This disclosure is intended to cover any and all subsequent adaptations or variations of various embodiments.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
in an electronic device with an application processor coupled to a data storage device, the data storage device including a controller, a volatile memory, a non-volatile memory, and a hibernate data bus, wherein the hibernate data bus is configured to enable a data transfer from the volatile memory to the non-volatile memory, and wherein the data transfer bypasses the controller, performing:
entering a hibernation mode of the electronic device, wherein entering the hibernation mode includes causing the data storage device to perform a data save operation by copying data from the volatile memory to the non-volatile memory via the hibernate data bus and powering off the volatile memory;
detecting a triggering event; and
exiting the hibernation mode responsive to detecting the triggering event, wherein exiting the hibernation mode includes causing the data storage device to power on the volatile memory and restore the data to the volatile memory.

2. The method of claim 1, wherein the triggering event is based on a temperature difference between a temperature sensed by a thermometer of the electronic device and a reference temperature.

3. The method of claim 1, wherein the triggering event is based on a detection of motion of the electronic device based on a difference between an audio sound acquired by a microphone of the electronic device and a reference audio sound.

4. The method of claim 1, wherein the triggering event is based on a detection of motion of the electronic device based on a difference between an image acquired by a camera of the electronic device and a reference image.

5. The method of claim 1, wherein the triggering event is based on a change in capacitance of the electronic device.

6. The method of claim 1, wherein the triggering event is based on a detection of motion of the electronic device sensed by an accelerometer.

7. The method of claim 1, wherein the triggering event is based on historical use data of the electronic device.

8. The method of claim 1, wherein the data storage device includes a packaged memory device that includes the volatile memory, the non-volatile memory, and the controller.

9. The method of claim 1, wherein the data storage device is removable from the electronic device.

10. The method of claim 1, wherein the data storage device is embedded in the electronic device.

11. An electronic device comprising:
a data storage device including a controller, a volatile memory, a non-volatile memory, and a hibernate data bus, wherein the hibernate data bus is configured to transfer data from the volatile memory to the non-volatile memory and wherein the transfer of the data bypasses the controller;
a processor coupled to the data storage device, the processor configured to initiate entering a hibernation mode, wherein entering the hibernation mode includes causing the data storage device to perform a data save operation by copying data from the volatile memory to the non-volatile memory via the hibernate data bus and powering off the volatile memory;
wherein the processor is configured to detect a triggering event and responsive to the processor detecting the triggering event, to initiate exiting of the hibernation mode; and
wherein existing the hibernation mode causes the data storage device to power on the volatile memory and copy data stored at the non-volatile memory to the volatile memory.

12. The electronic device of claim 11, wherein the triggering event is based on a temperature difference between a temperature sensed by a thermometer of the electronic device and a reference temperature.

13. The electronic device of claim 11, wherein the triggering event is based on a detection of motion of the electronic device based on a difference between an audio sound acquired by a microphone of the electronic device and a reference audio sound.

14. The electronic device of claim 11, wherein the triggering event is based on a detection of motion of the electronic device based on a difference between an image acquired by a camera of the electronic device and a reference image.

15. The electronic device of claim 11, wherein the triggering event is based on a change in capacitance of the electronic device.

16. The electronic device of claim 11, wherein the triggering event is based on a detection of motion of the electronic device sensed by an accelerometer.

17. The electronic device of claim 11, wherein the triggering event is based on a time difference between an alarm time set by a user and a system clock time.

18. The electronic device of claim 11, wherein the triggering event is based on historical use data of the electronic device.

19. The electronic device of claim 11, wherein the data storage device includes a packaged memory device that includes the memory, the non-volatile memory, and the controller.

20. The electronic device of claim 11, wherein the data storage device is removable from the electronic device.

21. The electronic device of claim 11, wherein the data storage device is embedded in the electronic device.

* * * * *

UNITED STATES PATENT AND TRADEMARK OFFICE
CERTIFICATE OF CORRECTION

PATENT NO.        : 9,069,551 B2
APPLICATION NO.   : 13/335332
DATED             : June 30, 2015
INVENTOR(S)       : Yaniv Iarovici et al.

Page 1 of 1

It is certified that error appears in the above-identified patent and that said Letters Patent is hereby corrected as shown below:

In the Claims, Column 30, Claim 11, Line 28, "wherein existing the hibernation mode causes the data" should be --wherein exiting the hibernation mode causes the data--.

Signed and Sealed this
First Day of March, 2016

Michelle K. Lee
*Director of the United States Patent and Trademark Office*